United States Patent
Yu et al.

(10) Patent No.: US 11,902,566 B2
(45) Date of Patent: Feb. 13, 2024

(54) GENERATING A MOTION VECTOR PREDICTOR LIST

(71) Applicant: Telefonaktiebolaget LM Ericsson (publ), Stockholm (SE)

(72) Inventors: Ruoyang Yu, Täby (SE); Du Liu, Solna (SE); Per Wennersten, Årsta (SE); Kenneth Andersson, Gävle (SE); Rickard Sjöberg, Stockholm (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 17/417,658

(22) PCT Filed: Dec. 19, 2019

(86) PCT No.: PCT/SE2019/051320
§ 371 (c)(1),
(2) Date: Jun. 23, 2021

(87) PCT Pub. No.: WO2020/139184
PCT Pub. Date: Jul. 2, 2020

(65) Prior Publication Data
US 2022/0060739 A1   Feb. 24, 2022

Related U.S. Application Data

(60) Provisional application No. 62/785,872, filed on Dec. 28, 2018, provisional application No. 62/786,253, filed on Dec. 28, 2018.

(51) Int. Cl.
*H04N 19/513* (2014.01)
*H04N 19/105* (2014.01)
(Continued)

(52) U.S. Cl.
CPC ......... *H04N 19/521* (2014.11); *H04N 19/105* (2014.11); *H04N 19/139* (2014.11); *H04N 19/176* (2014.11)

(58) Field of Classification Search
CPC .. H04N 19/521; H04N 19/105; H04N 19/139; H04N 19/176; H04N 19/52; H04N 19/129; H04N 19/513
See application file for complete search history.

(56) References Cited

U.S. PATENT DOCUMENTS

2013/0242046 A1   9/2013  Zhang et al.
2014/0205014 A1   7/2014  Nakamura et al.
(Continued)

FOREIGN PATENT DOCUMENTS

CN   103124353 A    5/2013
EP   2663077 A1   11/2013
(Continued)

OTHER PUBLICATIONS

International Search Report and Written Opinion of the International Searching Authority for PCT International Application No. PCT/SE2019/051320 dated Mar. 24, 2020.
(Continued)

*Primary Examiner* — Francis Geroleo
(74) *Attorney, Agent, or Firm* — Sage Patent Group

(57) ABSTRACT

A decoder can be configured to obtain a current inter block and a plurality of previously decoded inter blocks. Each inter block of the plurality of inter blocks can include a motion vector having a resolution. The decoder generates a list of motion vector predictor candidates that is used to predict the motion vector that is associated with the current inter block. Generating the list of motion vector predictor candidates can include defining a set of inter blocks that includes a number of previously decoded inter blocks; scanning the inter blocks
(Continued)

in the set of inter blocks in a scanning order; and for each of the inter blocks in the set of inter blocks: deriving a motion vector prediction candidate using the motion vector of the inter block; and determining whether a criterion is satisfied.

19 Claims, 20 Drawing Sheets

(51) Int. Cl.
*H04N 19/139* (2014.01)
*H04N 19/176* (2014.01)

(56) References Cited

U.S. PATENT DOCUMENTS

| | | | |
|---|---|---|---|
| 2015/0003521 | A1 | 1/2015 | Thirumalai et al. |
| 2016/0100188 | A1 | 4/2016 | Chuang et al. |
| 2017/0238005 | A1 | 8/2017 | Chien et al. |
| 2018/0359483 | A1* | 12/2018 | Chen .......... H04N 19/70 |
| 2020/0007889 | A1* | 1/2020 | Chao .......... H04N 19/423 |
| 2020/0014931 | A1* | 1/2020 | Hsiao .......... H04N 19/517 |
| 2020/0374542 | A1* | 11/2020 | Zhang .......... H04N 19/176 |
| 2021/0021824 | A1* | 1/2021 | Zheng .......... H04N 19/119 |
| 2021/0092379 | A1* | 3/2021 | Zhang .......... H04N 19/119 |
| 2021/0203922 | A1* | 7/2021 | Zhang .......... H04N 19/105 |

FOREIGN PATENT DOCUMENTS

| | | |
|---|---|---|
| EP | 2690870 A2 | 1/2014 |
| WO | 2013046707 A1 | 4/2013 |
| WO | 2014053512 A1 | 4/2014 |

OTHER PUBLICATIONS

Zhang et al., "Intra-Prediction Mode Propagation for Video Coding," IEEE Journal on Emerging and Selected Topics in Circuits and Systems, vol. 9, No. 1, Mar. 2019, 12 pages.

Huang et al., "CE4.1.6: Simplification of affine AMVP candidate list Construction," Joint Video Experts Team (JVET) of ITU-T SG 16 WP 3 and ISO/IEC JTC 1/SC 29/WG 11, 12th Meeting: Macao, CN, Oct. 3-12, 2018, Document: JVET-L0271, 4 pages.

Yu et al., "CE4-related: On MVP candidate list generation for AMVP," Joint Video Experts Team (JVET) of ITU-T SG 16 WP 3 and ISO/IEC JTC 1/SC 29/WG 11, 13th Meeting: Marrakech, MA, Jan. 9-18, 2019, Document: JVET-M0117, 4 pages.

Extended European Search Report, EP Application 19905221.8, dated Feb. 10, 2022, 12 pages.

Chen et al, "Algorithm description for Versatile Video Coding and Test Model 3 (VTM 3)", JVET of ITU-T SG 16 WP 3 and ISO/IEC JTC 1/SC 29/WG 11, 12th Meeting, JVET-L1002-v1, Macao, China, Oct. 3-12, 2018, 48 pages.

Zhao et al. "CE4-related: Simplification to History Based Motion Vector Prediction", JVET of ITU-T SG 16 WP 3 and ISO/IEC JTC 1/SC 29/WG 11, 12th Meeting, JVET-L0309, Macao, China, Oct. 3-12, 2018, 5 pages.

Yang et al. "CE4: Summary report on inter prediction and motion vector coding", JVET of ITU-T SG 16 WP 3 and ISO/IEC JTC 1/SC 29/WG 11, 12th Meeting, JVET-L0024-v2, Macao, China, Oct. 3-12, 2018, 48 pages.

Han et al. "CE4.4.6: Improvement on Merge/Skip mode", JVET of ITU-T SG 16 WP 3 and ISO/IEC JTC 1/SC 29/WG 11, 12th Meeting, JVET-L0399, Macao, China, Oct. 3-12, 2018, 6 pages.

Notice of Reasons for Rejection for Japanese Patent Application No. 2021-537997, dated Aug. 30, 2022, 5 pages.

Lee, et al. "CE4: Simplified affine MVP list construction (Test 4.1.4)", Joint Video Experts Team (JVET) of ITU-T SG 16 WP 3 and ISO/IEC JTC 1/SC 29/WG 11, JVET-L0141, 12th Meeting: Macau, China, Oct. 8-12, 2018, 7 pages.

Notice of Reasons for Rejection for Japanese Patent Application No. 2021-537997, dated Jan. 24, 2023, 5 pages.

International Telecommunication Union, "High efficiency video coding", Recommendation ITU-T, Telecommunication Standardization Sector of ITU, H.265, Apr. 2013, 317 pages.

* cited by examiner

| | Random Access Main 10 Over VTM-3.0 | | |
|---|---|---|---|
| | Y | U | V |
| Class A1 | 0.02% | 0.05% | 0.05% |
| Class A2 | -0.01% | -0.06% | 0.09% |
| Class B | 0.01% | 0.08% | -0.07% |
| Class C | 0.03% | 0.04% | 0.08% |
| Overall | 0.01% | 0.03% | 0.03% |
| Class D | 0.00% | -0.06% | 0.05% |
| Class F | 0.00% | 0.04% | 0.08% |

FIG. 7

GENERATING A MOTION VECTOR PREDICTOR LIST

CROSS REFERENCE TO RELATED APPLICATIONS

This application is a 35 U.S.C. § 371 national stage application of PCT International Application No. PCT/SE2019/051320 filed on Dec. 19, 2019, which claims the benefit of U.S. Provisional Patent Application Ser. No. 62/785,872, filed on Dec. 28, 2018, and U.S. Provisional Patent Application Ser. No. 62/786,253, filed on Dec. 28, 2018, the disclosures and content of which are incorporated by reference herein in their entireties.

TECHNICAL FIELD

The present disclosure relates generally to video processing, and more particularly, video encoding and/or decoding and related methods and devices.

BACKGROUND

A video sequence can include a series of pictures. In video coding, pictures can be split into small blocks as base units for prediction and residual coding. In the current test model (VTM) for the next video coding standard VVC, the blocks can be square or rectangular and have size of 4×4 up to 128×128.

Intra prediction, also known as spatial prediction, predicts a block using the previous decoded blocks within the same picture. A picture including only intra-predicted blocks can be referred to as an intra picture.

Inter prediction, also known as temporal prediction, predicts blocks of the current picture using blocks from previously decoded pictures. A picture that allows inter-predicted block can be referred to as an inter picture. The previous decoded pictures used for inter prediction can be referred to as reference pictures.

The location of the referenced block inside the reference picture can be indicated using a motion vector ("MV"). Each MV can include x and y components that represent the displacements between a current block and a referenced block in x or y dimension. FIG. 1 shows an example of a MV for a current block C.

In some examples, the value of a MV's components may have resolution other than integer position. The resolution (or precision) can be finer than an integer position. Those positions can be referred to as fractional positions and a filtering (e.g., interpolation) can be performed to calculate values used for prediction. In additional or alternative examples, the resolution can be coarser than an integer position.

In the current VVC, the MV resolution can be at 1/16-position, 1/4-position, integer position and 4-integer position. FIG. 2 depicts several positions in the horizontal dimension. The solid-square blocks represent integer positions. The dashed-square blocks represent 4-integer positions. The circles represent 1/16-position. The crosses represent 1/4-position.

A MV resolution converting process can be used when converting a MV at one resolution to another target resolution. One way of converting is to round the MV position to the nearest target position.

An inter picture may use several reference pictures. The reference pictures can be put into two reference picture lists, L0 and L1. The reference pictures that display before the current picture are typically the first pictures in L0. The reference pictures that display after the current picture can be the first pictures in L1.

Inter predicted blocks can use one of two prediction types, uni-prediction and bi-prediction. Uni-predicted block predicts from one reference picture, either using L0 or L1. Bi-prediction predicts from two reference pictures, one from L0 and the other from L1. FIG. 3 shows an example of the prediction types.

For an inter block inside an inter picture, its inter prediction information can include the following three elements in VTM: a reference picture list flag (RefPicListFlag), a reference picture index (RefPicInx) per reference picture list used; and a MV per reference picture used.

The flag signals which reference picture list is used. When the value of the flag equals to 0, L0 is used. When the value of the flag equals to 1, L1 is used. When the value of the flag equals to 2, it means both L0 and L1 are used. The reference picture index signals which reference picture inside the reference list to be used. The MV signals the position inside the reference picture that is used for predicting the current block.

The current VVC includes one process for signaling motion vector for each block: AMVP ("advanced motion vector prediction"). The AMVP method generates a list of motion vector candidates. The motion vector candidates can be referred to as motion vector predictors ("MVP"). The list can be referred to as a MVP list. The maximum size of the MVP list may be 2 in the current VTM. After the list is generated, one of the candidates in the list can be selected to predict the current MV.

For a current MV to be encoded, the encoder selects one MVP from the list, encodes an index (mvp_flag) as well as the MV difference (MVD) between the current MV and the MVP in the bitstream to signal to a decoder. The decoder receives the index and the MVD, it follows the same MVP list derivation process as the encoder and use the index to retrieve the correct candidate.

An example of a MVP candidate list generation process is described below. In this example, the current block has its MV at 1/4-position. The process can include deriving at most 2 MV candidates (mvA and mvB) from the spatially neighboring blocks A0, A1, B0, B1 and B2, as shown in FIGS. 4A-B. The process can further include comparing mvA and mvB. If they are different, both can be added to the MVP list. If they are the same, one (i.e. mvA or mvB) can be added to the MVP list. If the MVP list is not full, temporal MV candidate mvC can be derived from the temporally collocated blocks C0 and C1. The temporally collocated blocks can be within a previously decoded picture. The mvC can be compared with the existing candidate in the MVP list, and mvC can be added to the list if there is no existing candidate equal to mvC. If the MVP list is still not full, candidates from the HMVP table can be added in a predefined order. The order can be from the last entry to the first entry (i.e. the most recent HMVP candidate is checked first). The adding of HMVP candidates can stop when the maximum number of checked HMVP candidates reaches a threshold (=4 in VTM-3) or the MVP list is full.

For each candidate in the HMVP table, its motion vector mvLx (x being 0 or 1) may checked according to the following operations: (i) Check if mvLx uses the same reference picture as the current block; and (2) if yes, then compare mvLx to the existing candidate in the MVP list, add mvLx to the MVP list if there is no existing candidate equal to mvLx.

If the MVP list is still not full, zero MV candidates can be added until it is full. For each MV in the MVP list, MV can be converted from 1/16-pel precision to 1/4-pel precision.

The HMVP (history-based motion vector prediction) candidate is a newly adopted candidate generation method. During the encoding/decoding process, a first-in-first-out (FIFO) table with a limited number (=6) of slots for storing motion information can be maintained. The motion information stored in the FIFO table can be referred to as HMVP candidates.

Whenever there is an inter-coded block encoded/decoded, the inter block's motion information can be added to the last entry of the FIFO table as a new HMVP candidate. If there is already an identical HMVP candidate inside the table, the identical candidate can be removed from the table and all the HMVP candidates afterwards are moved forward inside the table. If there is no identical HMVP candidate and the table already contains 6 HMVP candidates. The first HMVP candidate in the table can be removed.

FIG. 5 shows an example of the HMVP table, for simplicity, assuming all the HMVP candidates have the same RefPicListFlag and RefPicIdx. For example, when an inter block with MV=(1, 0) gets decoded, the MV can be added as the last entry in the table. Since there is an identical HMVP candidate (HMVP 2) inside the table, that identical candidate can be removed. FIGS. 6A-C illustrate the table update process. FIG. 6A depicts the HMVP candidates from FIG. 5 and a new decoded block. FIG. 6B depict an updated process in which the new decoded block is added and HMVP 2 is indicated as being removed. FIG. 6C depicts an updated table of HMVP candidates. Those HMVP candidates inside the table are used as additional candidates for generating the MVP list.

SUMMARY

According to some embodiments, a method for generating a motion vector predictor list is provided. The method can include obtaining a current inter block and previously decoded inter blocks. Each inter block can include a motion vector having a resolution. The method can further include generating a list of motion vector predictor candidates that is used to predict the motion vector that is associated with the current inter block. Generating the list of motion vector predictor candidates can include defining a set of inter blocks that includes a given number of previously decoded inter blocks. Generating the list of motion vector predictor candidates can further include scanning the inter blocks in the set of inter blocks in a given scanning order. For each of the inter blocks in the set of inter blocks, generating the list of motion vector predictor candidates can further include deriving a motion vector prediction candidate using the motion vector of the inter block and determining if a given criterion is satisfied. Responsive to the given criterion being satisfied, the method can include adding the motion vector prediction candidate to the list of motion vector prediction candidates without performing a comparison with existing motion vector prediction candidates that are in the list of motion vector prediction candidates. Responsive to the criterion not being satisfied, the method can further include performing a motion vector comparison operation to compare the motion vector prediction candidate with existing motion vector prediction candidates that are in the list of motion vector prediction candidates corresponding to the current block.

According to other embodiments, a method performed by an encoder (or a processor circuit in the encoder) is provided. The method can include obtaining a current inter block and a plurality of previously decoded inter blocks. Each inter block of the plurality of inter blocks including a motion vector having a resolution. The method can further include generating a list of motion vector predictor candidates that is used to predict the motion vector that is associated with the current inter block. Generating the list of motion vector predictor candidates can include defining a set of inter blocks that includes a number of previously decoded inter blocks; scanning the inter blocks in the set of inter blocks in a scanning order; and for each of the inter blocks in the set of inter blocks, deriving a motion vector prediction candidate using the motion vector of the inter block; and determining whether a criterion is satisfied. Responsive to determining that the criterion is satisfied, the method can further include adding the motion vector prediction candidate to the list of motion vector prediction candidates without performing a comparison with existing motion vector prediction candidates that are in the list of motion vector prediction candidates. Responsive to determining that the criterion is not satisfied, the method can further include performing a motion vector comparison operation to compare the motion vector prediction candidate with existing motion vector prediction candidates that are in the list of motion vector prediction candidates corresponding to the current inter block.

According to other embodiments, a decoder for a communication network is provided. The decoder can include a processor and memory coupled with the processor. The memory can include instructions that when executed by the processor cause the processor to perform operations. The operations can include obtaining a current inter block and a plurality of previously decoded inter blocks, each inter block of the plurality of inter blocks including a motion vector having a resolution. The operations can further include generating a list of motion vector predictor candidates that is used to predict the motion vector that is associated with the current inter block. Generating the list of motion vector predictor candidates can include defining a set of inter blocks that includes a number of previously decoded inter blocks; scanning the inter blocks in the set of inter blocks in a scanning order; and for each of the inter blocks in the set of inter blocks: deriving a motion vector prediction candidate using the motion vector of the inter block; and determining whether a criterion is satisfied. Responsive to determining that the criterion is satisfied, the operations can further include adding the motion vector prediction candidate to the list of motion vector prediction candidates without performing a comparison with existing motion vector prediction candidates that are in the list of motion vector prediction candidates. Responsive to determining that the criterion is not satisfied, the operations can further include performing a motion vector comparison operation to compare the motion vector prediction candidate with existing motion vector prediction candidates that are in the list of motion vector prediction candidates corresponding to the current inter block.

According to other embodiments, an encoder for a communication network is provided. The encoder can include a processor and memory coupled with the processor. The memory can include instructions that when executed by the processor cause the processor to perform operations. The operations can include obtaining a current inter block and a plurality of previously decoded inter blocks, each inter block of the plurality of inter blocks including a motion vector having a resolution. The operations can further include generating a list of motion vector predictor candidates that is used to predict the motion vector that is associated with the current inter block. Generating the list of motion vector predictor candidates can include defining a set of inter blocks that includes a number of previously decoded inter blocks; scanning the inter blocks in the set of inter blocks in a scanning order. Generating the list of motion vector predictor candidates can further include for each of the inter blocks in the set of inter blocks deriving a motion vector prediction candidate using the motion vector of the inter block and determining whether a criterion is satisfied. Generating the list of motion vector predictor candidates can further include, responsive to determining that the criterion is satisfied, adding the motion vector prediction candidate to the list of motion vector prediction candidates without performing a comparison with existing motion vector prediction candidates that are in the list of motion vector prediction candidates. Generating the list of motion vector predictor candidates can further include, responsive to determining that the criterion is not satisfied, performing a motion vector comparison operation to compare the motion vector prediction candidate with existing motion vector prediction candidates that are in the list of motion vector prediction candidates corresponding to the current inter block.

According to other embodiments, a computer program is provided. The computer program has computer-executable instructions configured to cause a decoder to perform operations when the computer-executable instructions are executed on a processor in the decoder. The operations can include obtaining a current inter block and a plurality of previously decoded inter blocks, each inter block of the plurality of inter blocks including a motion vector having a resolution. The operations can further include generating a list of motion vector predictor candidates that is used to predict the motion vector that is associated with the current inter block. Generating the list of motion vector predictor candidates includes defining a set of inter blocks that includes a number of previously decoded inter blocks and scanning the inter blocks in the set of inter blocks in a scanning order. Generating the list of motion vector predictor candidates can include for each of the inter blocks in the set of inter blocks deriving a motion vector prediction candidate using the motion vector of the inter block and determining whether a criterion is satisfied. Generating the list of motion vector predictor candidates can include, responsive to determining that the criterion is satisfied, adding the motion vector prediction candidate to the list of motion vector prediction candidates without performing a comparison with existing motion vector prediction candidates that are in the list of motion vector prediction candidates. Generating the list of motion vector predictor candidates can include, responsive to determining that the criterion is not satisfied, performing a motion vector comparison operation to compare the motion vector prediction candidate with existing motion vector prediction candidates that are in the list of motion vector prediction candidates corresponding to the current inter block.

According to other embodiments, a computer program is provided. The computer program has computer-executable instructions configured to cause an encoder to perform operations, when the computer-executable instructions are executed on a processor comprised in the encoder. The operations include obtaining a current inter block and a plurality of previously decoded inter blocks, each inter block of the plurality of inter blocks including a motion vector having a resolution. The operations further include generating a list of motion vector predictor candidates that is used to predict the motion vector that is associated with the current inter block. Generating the list of motion vector predictor candidates includes defining a set of inter blocks that includes a number of previously decoded inter blocks and scanning the inter blocks in the set of inter blocks in a scanning order. Generating the list of motion vector predictor candidates can include for each of the inter blocks in the set of inter blocks, deriving a motion vector prediction candidate using the motion vector of the inter block and determining whether a criterion is satisfied. Generating the list of motion vector predictor candidates can further include, responsive to determining that the criterion is satisfied, adding the motion vector prediction candidate to the list of motion vector prediction candidates without performing a comparison with existing motion vector prediction candidates that are in the list of motion vector prediction candidates. Generating the list of motion vector predictor candidates can include, responsive to determining that the criterion is not satisfied, performing a motion vector comparison operation to compare the motion vector prediction candidate with existing motion vector prediction candidates that are in the list of motion vector prediction candidates corresponding to the current inter block.

According to other embodiments, a computer program product is provided. The computer program product includes a computer-readable storage medium, the computer-readable storage medium having computer-executable instructions configured to cause a decoder to perform operations when the computer-executable instructions are executed on a processor comprised in the decoder. The operations include obtaining a current inter block and a plurality of previously decoded inter blocks, each inter block of the plurality of inter blocks including a motion vector having a resolution. The operations can further include generating a list of motion vector predictor candidates that is used to predict the motion vector that is associated with the current inter block. Generating the list of motion vector predictor candidates can include defining a set of inter blocks that includes a number of previously decoded inter blocks and scanning the inter blocks in the set of inter blocks in a scanning order. Generating the list of motion vector predictor candidates can further include for each of the inter blocks in the set of inter blocks deriving a motion vector prediction candidate using the motion vector of the inter block and determining whether a criterion is satisfied. Generating the list of motion vector predictor candidates can further include, responsive to determining that the criterion is satisfied, adding the motion vector prediction candidate to the list of motion vector prediction candidates without performing a comparison with existing motion vector prediction candidates that are in the list of motion vector prediction candidates. Generating the list of motion vector predictor candidates can further include, responsive to determining that the criterion is not satisfied, performing a motion vector comparison operation to compare the motion vector prediction candidate with existing motion vector prediction candidates that are in the list of motion vector prediction candidates corresponding to the current inter block.

According to other embodiments, a computer program product is provided. The computer program product can include a computer-readable storage medium, the computer-readable storage medium having computer-executable instructions configured to cause an encoder to perform operations when the computer-executable instructions are executed on a processor comprised in the encoder. The operations can include obtaining a current inter block and a plurality of previously decoded inter blocks, each inter block of the plurality of inter blocks including a motion vector having a resolution. The operations can further include generating a list of motion vector predictor candidates that is used to predict the motion vector that is associated with the current inter block. Generating the list of motion vector predictor candidates can include defining a set of inter blocks that includes a number of previously decoded inter blocks and scanning the inter blocks in the set of inter blocks in a scanning order. Generating the list of motion vector predictor candidates can further include, for each of the inter blocks in the set of inter blocks, deriving a motion vector prediction candidate using the motion vector of the inter block and determining whether a criterion is satisfied. Generating the list of motion vector predictor candidates can further include, responsive to determining that the criterion is satisfied, adding the motion vector prediction candidate to the list of motion vector prediction candidates without performing a comparison with existing motion vector prediction candidates that are in the list of motion vector prediction candidates. Generating the list of motion vector predictor candidates can further include, responsive to determining that the criterion is not satisfied, performing (1334) a motion vector comparison operation to compare the motion vector prediction candidate with existing motion vector prediction candidates that are in the list of motion vector prediction candidates corresponding to the current inter block.

According to other embodiments, an apparatus is provided. The apparatus can include at least one processor and memory communicatively coupled to the at least one processor. The memory can include instructions executable by the processor, which cause the processor to perform operations. The operations can include obtaining a current inter block and a plurality of previously decoded inter blocks, each inter block of the plurality of inter blocks including a motion vector having a resolution. The operations can further include generating a list of motion vector predictor candidates that is used to predict the motion vector that is associated with the current inter block. Generating the list of motion vector predictor candidates can include defining a set of inter blocks that includes a number of previously decoded inter blocks and scanning the inter blocks in the set of inter blocks in a scanning order. Generating the list of motion vector predictor candidates can further include, for each of the inter blocks in the set of inter blocks, deriving a motion vector prediction candidate using the motion vector of the inter block and determining whether a criterion is satisfied. Generating the list of motion vector predictor candidates can further include, responsive to determining that the criterion is satisfied, adding the motion vector prediction candidate to the list of motion vector prediction candidates without performing a comparison with existing motion vector prediction candidates that are in the list of motion vector prediction candidates. Generating the list of motion vector predictor candidates can further include, responsive to determining that the criterion is not satisfied, performing a motion vector comparison operation to compare the motion vector prediction candidate with existing motion vector prediction candidates that are in the list of motion vector prediction candidates corresponding to the current inter block.

According to other embodiments, a computer program product is provided. The computer program product includes a non-transitory computer readable medium storing computer program code which when executed by at least one processor causes the at least one processor to perform operations. The operations can include obtaining a current inter block and a plurality of previously decoded inter blocks, each inter block of the plurality of inter blocks including a motion vector having a resolution. The operations can further include generating a list of motion vector predictor candidates that is used to predict the motion vector that is associated with the current inter block. Generating the list of motion vector predictor candidates can include defining a set of inter blocks that includes a number of previously decoded inter blocks and scanning the inter blocks in the set of inter blocks in a scanning order. Generating the list of motion vector predictor candidates can further include, for each of the inter blocks in the set of inter blocks, deriving a motion vector prediction candidate using the motion vector of the inter block and determining whether a criterion is satisfied. Generating the list of motion vector predictor candidates can further include, responsive to determining that the criterion is satisfied, to adding the motion vector prediction candidate to the list of motion vector prediction candidates without performing a comparison with existing motion vector prediction candidates that are in the list of motion vector prediction candidates. Generating the list of motion vector predictor candidates can further include, responsive to determining that the criterion is not satisfied, to performing a motion vector comparison operation to compare the motion vector prediction candidate with existing motion vector prediction candidates that are in the list of motion vector prediction candidates corresponding to the current inter block.

In some embodiments, generating a motion vector predictor list can reduce the worst-case number of MV comparisons and can be friendlier to hardware implementation compared to the existing method.

BRIEF DESCRIPTION OF THE DRAWINGS

The accompanying drawings, which are included to provide a further understanding of the disclosure and are incorporated in and constitute a part of this application, illustrate certain non-limiting embodiments of inventive concepts. In the drawings:

FIG. 7 is a table illustrating an example of random access main 10 according to some embodiments of the present disclosure;

DETAILED DESCRIPTION

Figure 1:
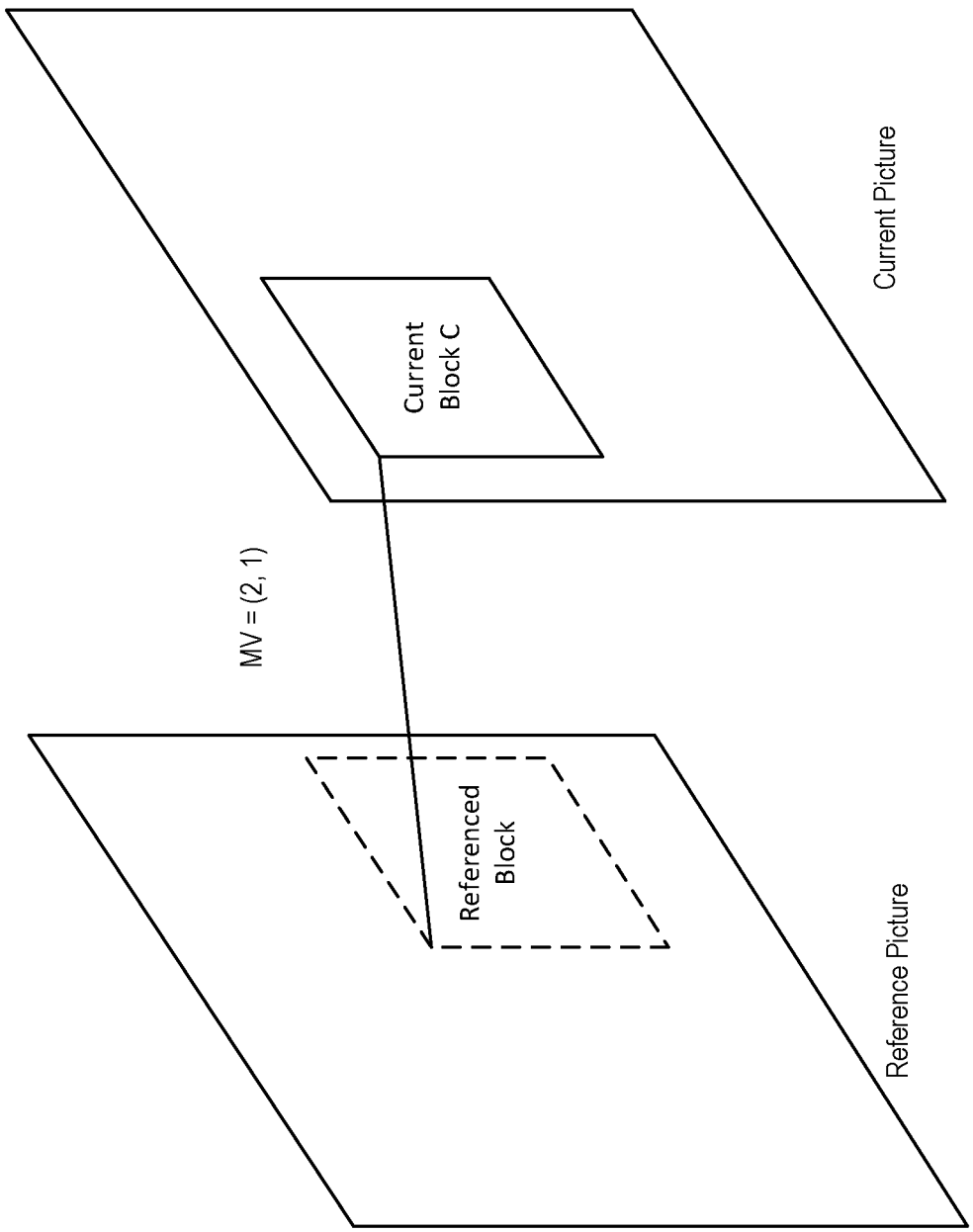
FIG. 1 is a schematic diagram illustrating an example of a motion vector ("MV")
Figure 2:
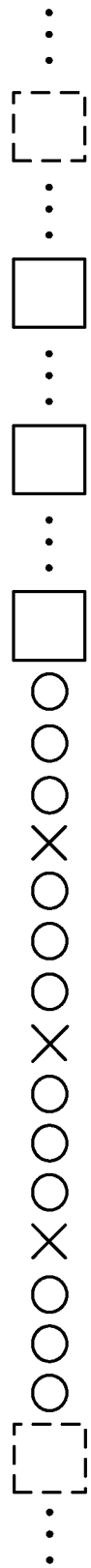
FIG. 2 is a schematic diagram illustrating an example of MV resolutions.
Figure 3:
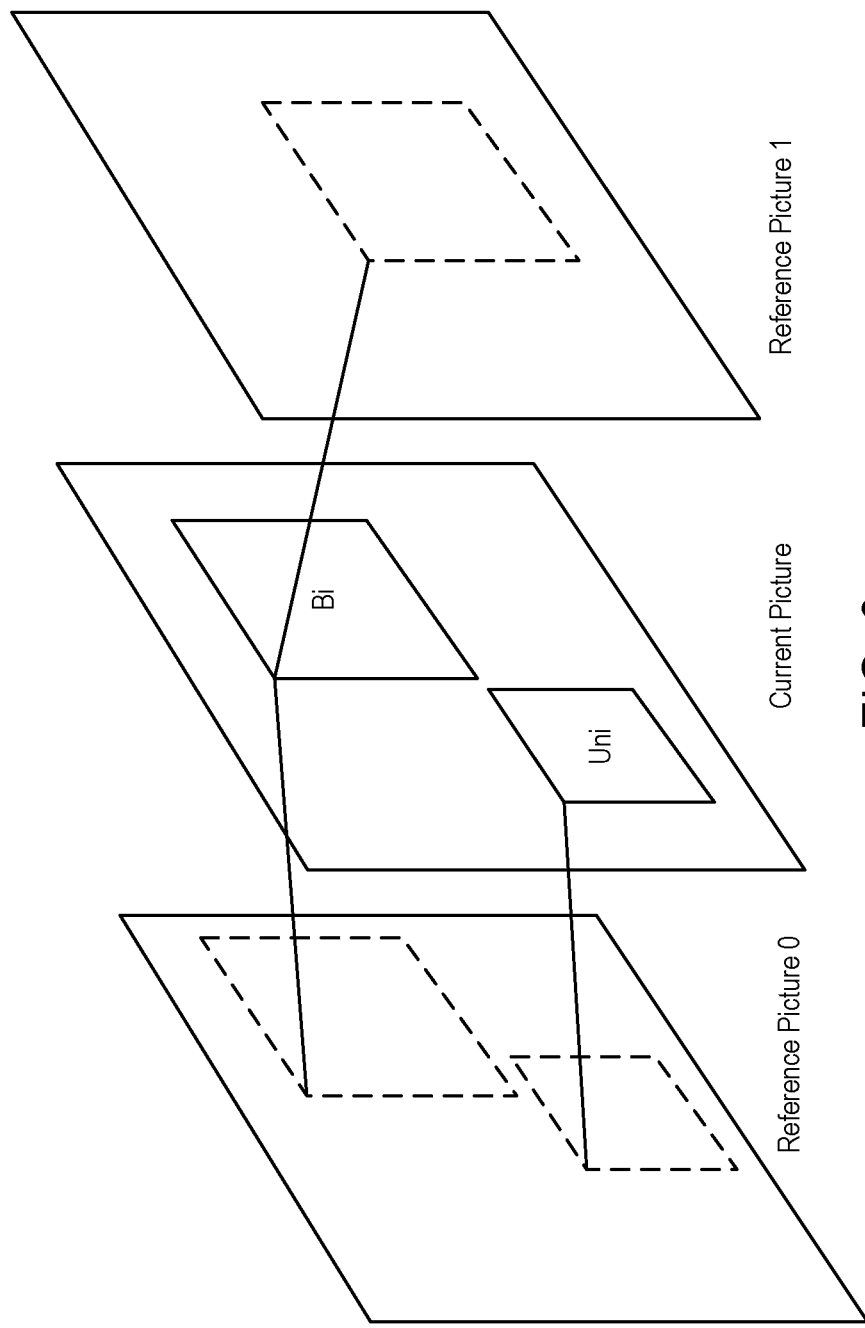
FIG. 3 is a schematic diagram illustrating an example of uni-inter prediction and bi-inter prediction.

Inventive concepts will now be described more fully hereinafter with reference to the accompanying drawings, in which examples of embodiments of inventive concepts are shown. Inventive concepts may, however, be embodied in many different forms and should not be construed as limited to the embodiments set forth herein. Rather, these embodiments are provided so that this disclosure will be thorough and complete, and will fully convey the scope of present inventive concepts to those skilled in the art. It should also be noted that these embodiments are not mutually exclusive. Components from one embodiment may be tacitly assumed to be present/used in another embodiment.

As described above, some current MVP list generation process perform MV comparison when adding a new candidate MV into the MVP list. The number of MV comparisons using this process can be, in an undesirable scenario, 10. Various embodiments herein describe an alternative process for generating motion vector predictor list for AMVP that can with fewer MV comparisons. Some embodiments can avoid some MV comparisons when a criterion is met. In some embodiments, this can be achieved by only comparing the first, most likely, possible list entries. Later possible entries are added without the comparison, which can result in a small chance that two motion vectors in the list are duplicates but reduces complexity.

In some embodiments, the process described herein can reduce the worst-case MV comparison number and can be friendlier to hardware implementation than existing processes. FIG. 7 depicts a table showing an example of objective performance from an implementation of various embodiments. The test was performed on top of the VVC test model VTM-3.0. The numbers in the table show the relative bit-cost for a codec under test to achieve equivalent video quality as a reference codec. The reference codec used here is VTM-3.0 as is and the codec under test is VTM-3.0 modified according to the teachings described herein. In some embodiments, a process for generating a motion vector predictor ("MVP") list can be performed by an encoder or a decoder.

In some embodiments, a process is provided for decoding or encoding a current inter block (K) with its motion vector mvK at a resolution R. The process can derive an MVP list with MV candidates at the resolution R for predicting the mvK. A decoder or an encoder may implement this process for MVP list generation that includes all or a subset of the following operations. (1) Define a set, A, that consists of a number of previously decoded inter blocks. The blocks can either be in the current picture or in previously decoded pictures. (2) Scan the blocks included in the set A in an order. (3) For each block S in set A, (a) Derive a MV candidate mvS using the MV of the block S; (b) Perform conversion of the mvS to the resolution R if the mvS is at a resolution other than R; (c) Determine if a criterion C is met; (d) When the criterion C is met, directly add the mvS to the existing MVP list, i.e. without performing MV comparison against the existing MV candidates in the MVP list; and (e) When the criterion C is not met, a MV comparison process is invoked to compare the mvS with the existing MV candidates in the MVP list. When there is no existing candidate equal to mvS, add the mvS to the existing MVP list. Otherwise do not add the mvS to the existing MVP list.

Figure 4B:
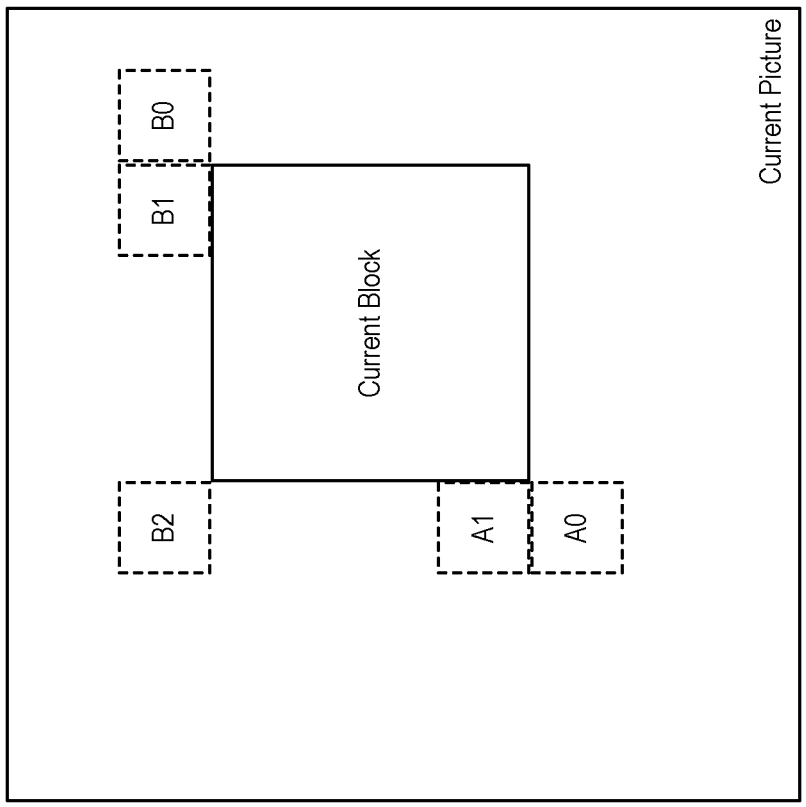
FIGS. 4A-B are schematic diagrams illustrating an example of blocks for fetching MV candidates.
Figure 4A:
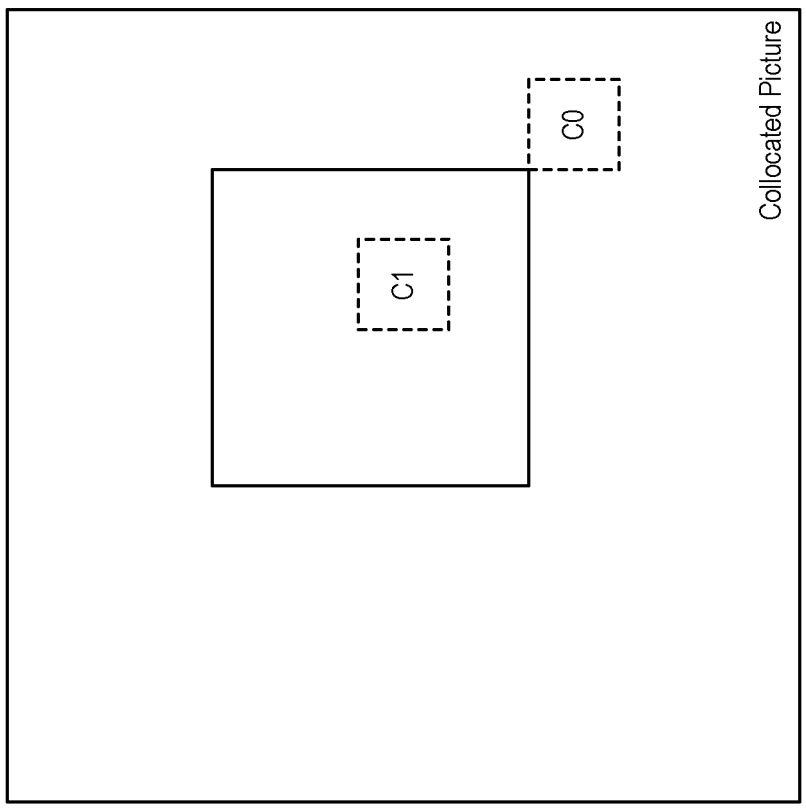
Figure 5:
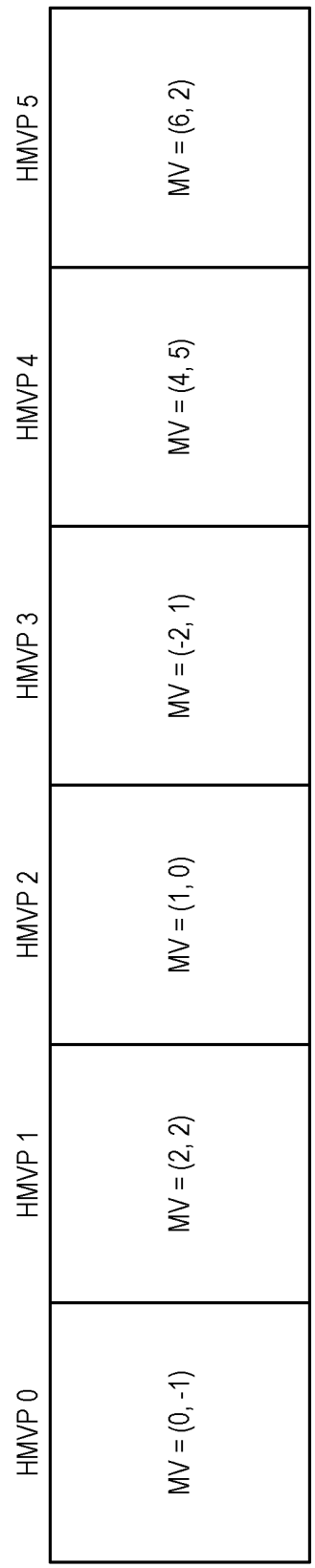
FIG. 5 is a block diagram illustrating an example of history-based motion vector prediction ("HMVP") candidates.
Figure 6:
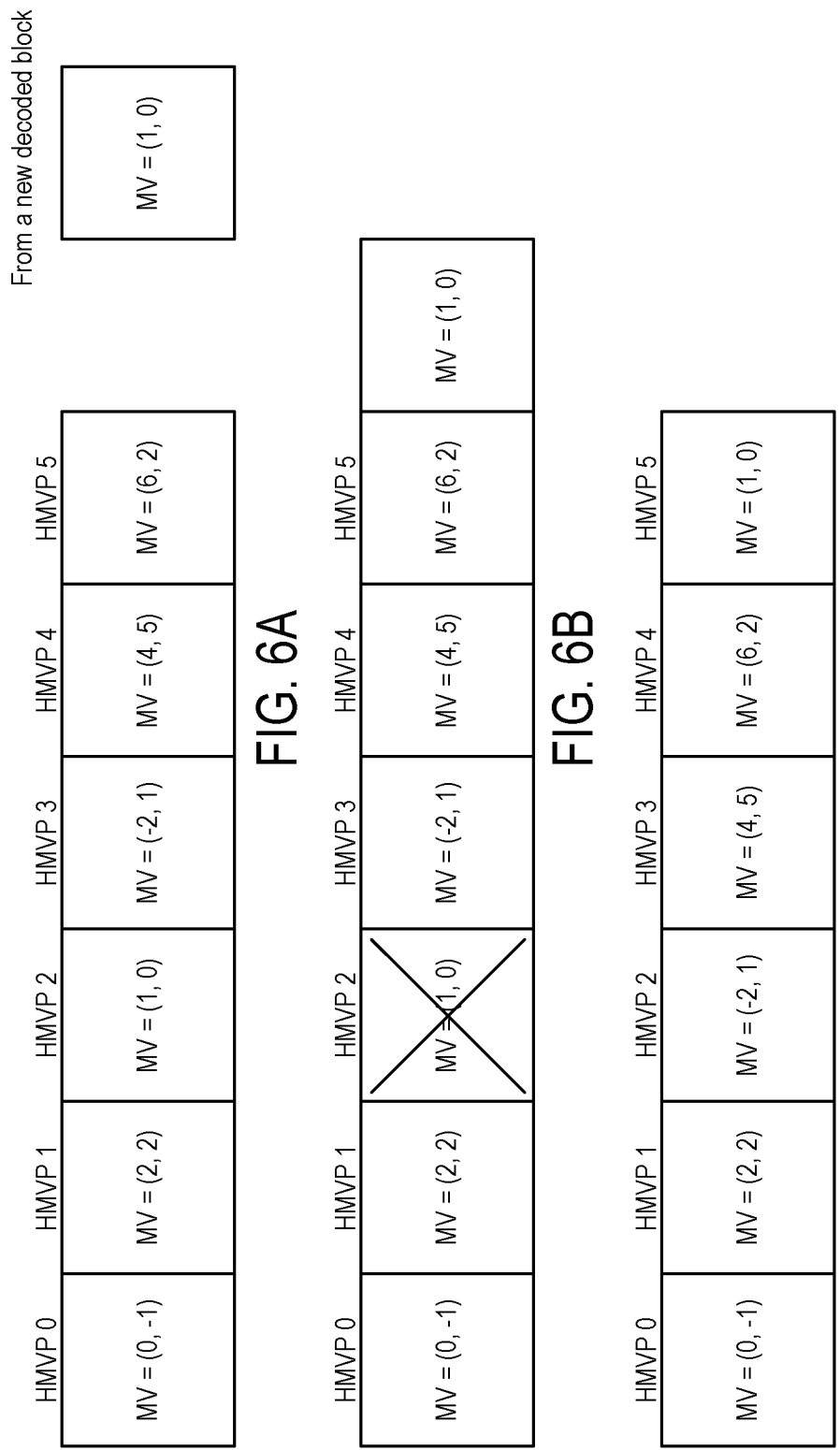
FIG. 6A-C are block diagrams illustrating an example of a HMVP table update process.
Figure 8:
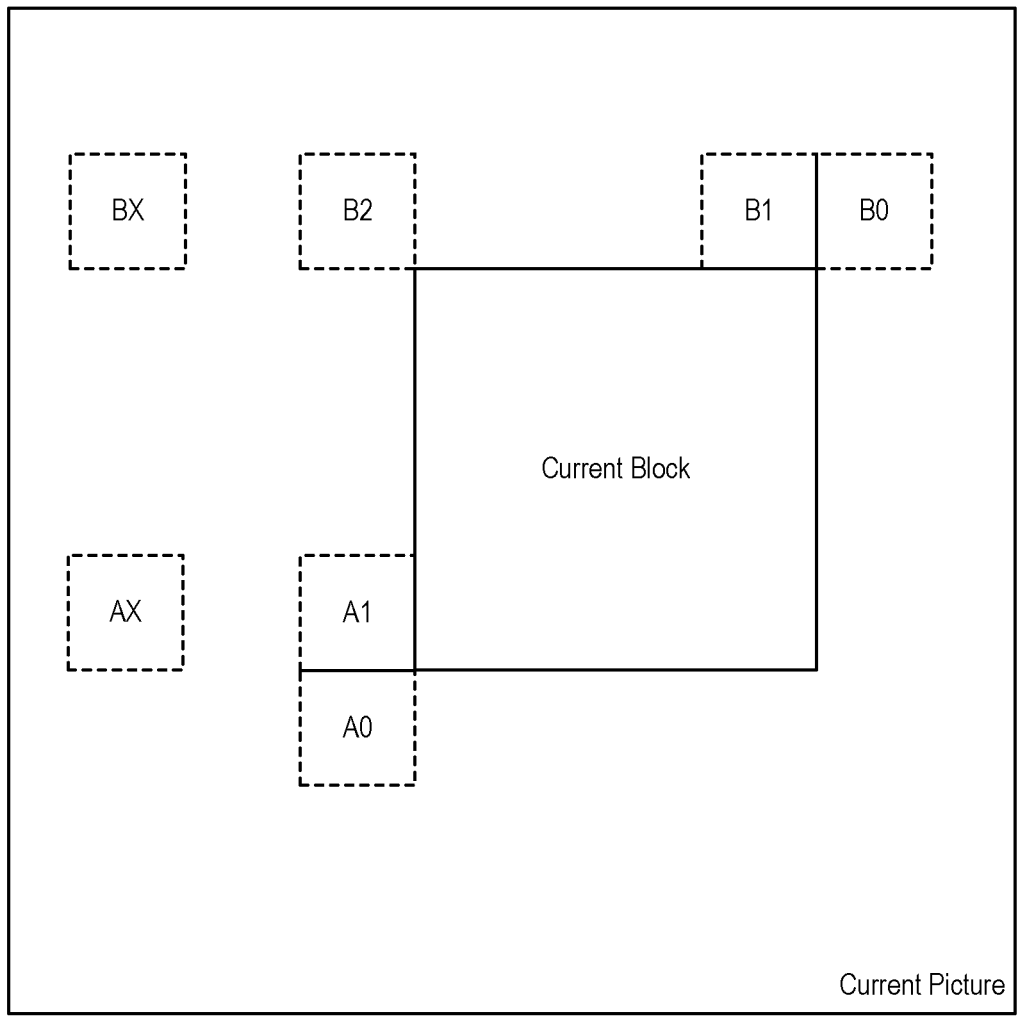
FIG. 8 is a schematic diagram illustrating an example of non-adjacent block AX and BX according to some embodiments of the present disclosure.

In additional or alternative embodiments, the criterion C can determine whether the block S is not spatially adjacent to the current block K. An example of adjacent blocks is shown as A0, A1, B0, B1 and B2 in FIGS. 4A-B. Another example of non-adjacent block is shown as AX, BX in the FIG. 8. Another alternative is to determine whether the spatial distance between the block S to the current block K is larger than or not smaller than a certain threshold. The spatial distance can be measured by the distance between samples in block S and K.

In additional or alternative embodiments, the criterion C is met if the block S is from another picture. An example of the blocks in another picture is C0 and C1 in FIG. 4.

In additional or alternative embodiments, the criterion C is met if the MV associated with the block S is included in the HMVP table.

In additional or alternative embodiments, the criterion C is met if both or one of the components of the MVD associated with current block K exceeds a certain threshold.

In additional or alternative embodiments, the criterion C is met if the resolution R exceeds a certain threshold. One example of the threshold is the integer position.

In additional or alternative embodiments, the MVP generation process can include a counter for counting how many times the MV comparison is invoked. The counter can be maintained during the MVP list generation process. Before starting a new MVP list generation, the counter can be set to an initial state, i.e. 0. During the MVP list generation process, the counter can be incremented by 1 each time an MV comparison process is invoked. The criterion C is met if the counter is larger than or not smaller than a certain threshold. The threshold may be lower than the maximum size of the MVP list.

In additional or alternative embodiments, the scan order can be to scan blocks in their decoding order. In other words, the block that is decoded the earliest among blocks in A can be scanned first.

In additional or alternative embodiments, the motion information derivation process and the motion information storage process for an intra block can be improvements over existing MVP list generation processes.

Figure 9:
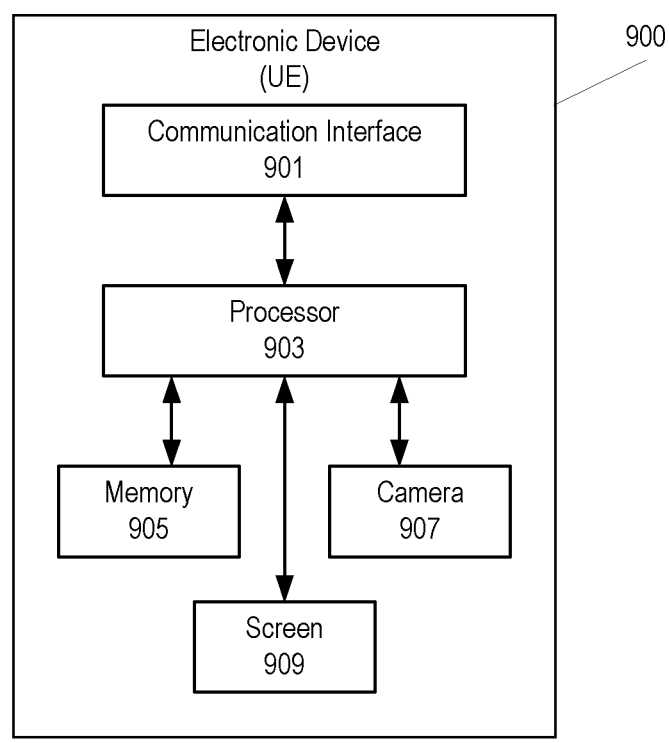
FIG. 9 is a block diagram illustrating an example of an electronic device (UE) for generating a motion vector predictor list according to some embodiments of the present disclosure.

FIG. 9 is a block diagram illustrating an electronic device 900 (which may be a wireless device, a 3GPP user equipment or UE device, etc.) according to some embodiments disclosed herein. As shown, electronic device 900 may include processor 903 coupled with communication interface 901, memory 905, camera 907, and screen 909. Communication interface 901 may include one or more of a wired network interface (e.g., an Ethernet interface), a WiFi interface, a cellular radio access network (RAN) interface (also referred to as a RAN transceiver), and/or other wired/wireless network communication interfaces. Electronic device 900 can thus provide wired/wireless communication over one or more wire/radio links with a remote storage system to transmit and/or receive an encoded video sequence. Processor 903 (also referred to as a processor circuit or processing circuitry) may include one or more data processing circuits, such as a general purpose and/or special purpose processor (e.g., microprocessor and/or digital signal processor). Processor 903 may be configured to execute computer program instructions from functional modules in memory 905 (also referred to as a memory circuit or memory circuitry), described below as a computer readable medium, to perform some or all of the operations and methods that are described herein for one or more of the embodiments. Moreover, processor 903 may be defined to include memory so that separate memory 905 may not be required. Electronic device 900 including, communication interface 901, processor 903, and/or camera 907 may thus perform operations, for example, discussed below with respect to the figures and/or Example Embodiments.

According to some embodiments, electronic device 900 (e.g., a smartphone) may generate an encoded video sequence that is either stored in memory 905 and/or transmitted through communication interface 901 over a wired network and/or wireless network to a remoted device. In such embodiments, processor 903 may receive a video sequence from camera 909, and processor may encode the video sequence to provide the encoded video sequence that may be stored in memory 905 and/or transmitted through communication interface 901 to a remote device.

According to some other embodiments, electronic device 900 may decode an encoded video sequence to provide a decoded video sequence that is rendered on display 909 for a user to view. The encoded video sequence may be received from a remote communication device through communication interface 901 and stored in memory 905 before decoding and rendering by processor 903, or the encoded video sequence may be generated by processor 903 responsive to a video sequence received from camera 907 and stored in memory 905 before decoding and rendering by processor 903. Accordingly, the same device may thus encode a video sequence and then decode the video sequence. Operations of encoding and decoding performed by processor 903 will now be discussed with reference to FIGS. 10-11.

Figure 10:
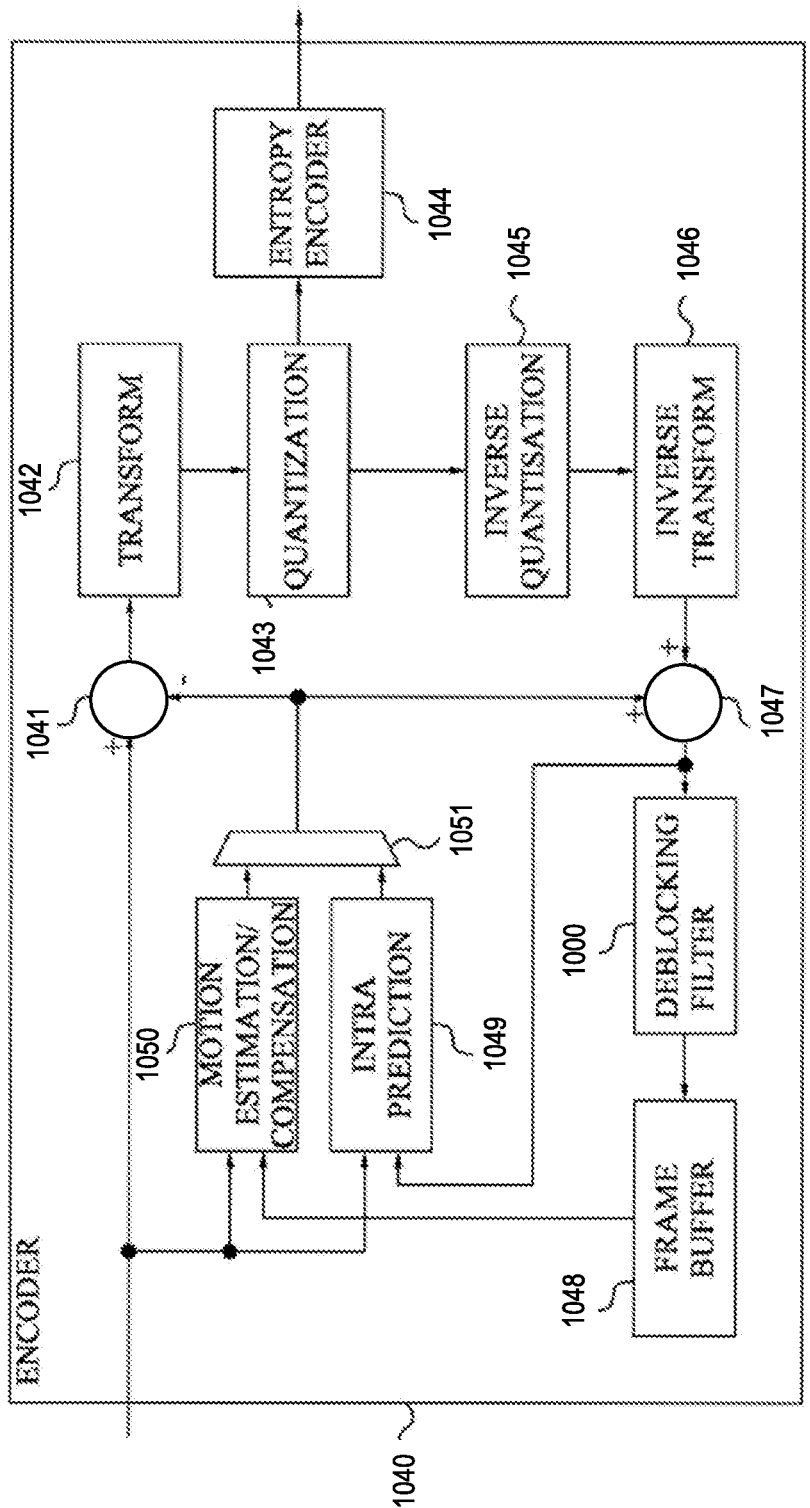
FIG. 10 is a block diagram illustrating an example of encoder operations according to some embodiments of the present disclosure.

FIG. 10 is a schematic block diagram of an encoder 1040 which may be implemented by processor 903 to encode a block of pixels in a video image (also referred to as a frame) of a video sequence according to some embodiments of inventive concepts.

A current block of pixels is predicted by performing a motion estimation using motion estimator 1050 from an already provided block of pixels in the same frame or in a previous frame. The result of the motion estimation is a motion or displacement vector associated with the reference block, in the case of inter prediction. The motion vector may be used by motion compensator 1050 to output an inter prediction of the block of pixels.

Intra predictor 1049 computes an intra prediction of the current block of pixels. The outputs from the motion estimator/compensator 1050 and the intra predictor 1049 are input in selector 1051 that either selects intra prediction or inter prediction for the current block of pixels. The output from the selector 1051 is input to an error calculator in the form of adder 1041 that also receives the pixel values of the current block of pixels. Adder 1041 calculates and outputs a residual error as the difference in pixel values between the block of pixels and its prediction.

The error is transformed in transformer 1042, such as by a discrete cosine transform, and quantized by quantizer 1043 followed by coding in encoder 1044, such as by entropy encoder. In inter coding, also the estimated motion vector is brought to encoder 1044 to generate the coded representation of the current block of pixels.

The transformed and quantized residual error for the current block of pixels is also provided to an inverse quantizer 1045 and inverse transformer 1046 to retrieve the original residual error. This error is added by adder 1047 to the block prediction output from the motion compensator 1050 or intra predictor 1049 to create a reference block of pixels that can be used in the prediction and coding of a next block of pixels. This new reference block is first processed by a deblocking filter 1000 according to some embodiments to perform deblocking filtering to reduce/combat blocking artifacts. The processed new reference block is then temporarily stored in frame buffer 1048, where it is available to intra predictor 1049 and motion estimator/compensator 1050.

Figure 11:
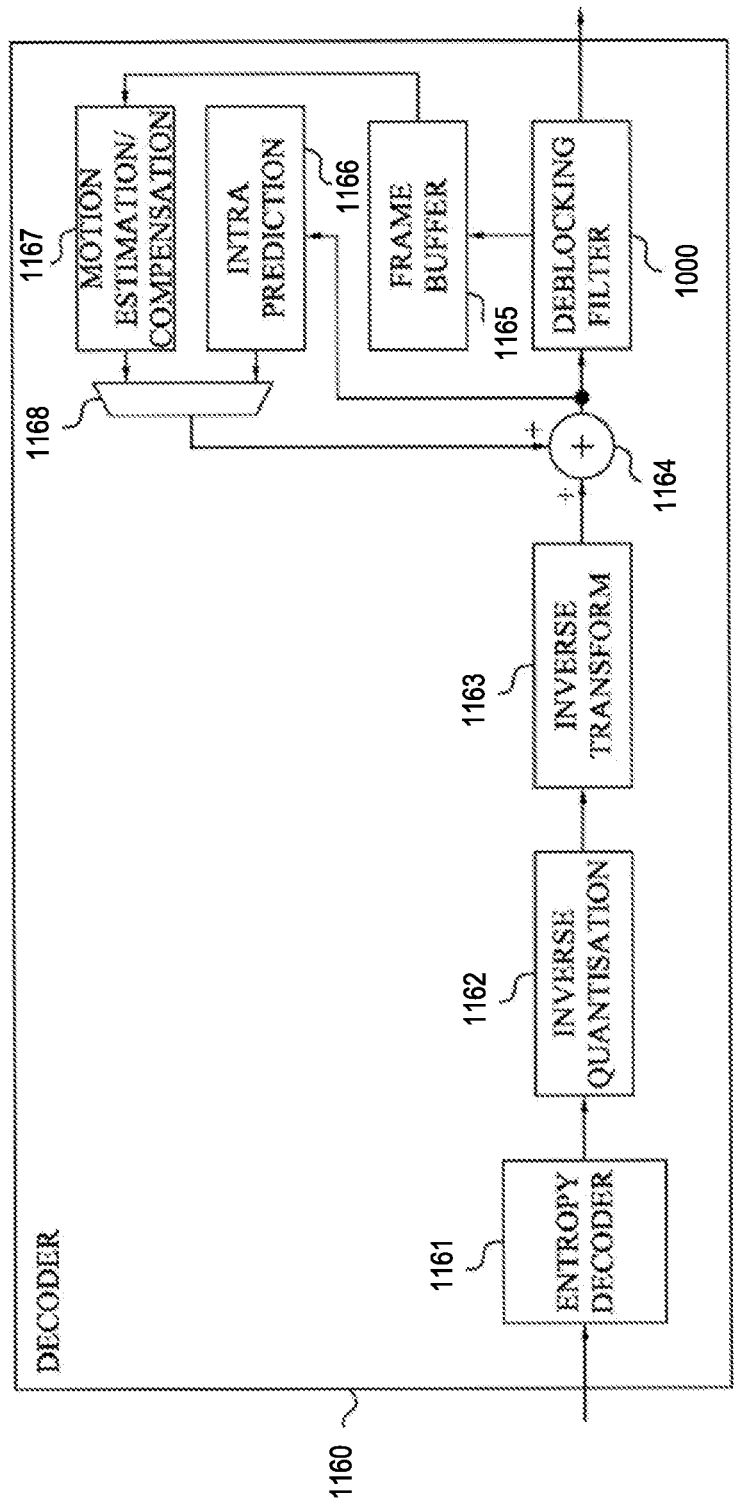
FIG. 11 is a block diagram illustrating an example of decoder operations according to some embodiments of the present disclosure.

FIG. 11 is a corresponding schematic block diagram of decoder 1160 including deblocking filter 1000 which may be implemented by processor 503 according to some embodiments of inventive concepts. Decoder 1160 includes decoder 1161, such as entropy decoder, to decode an encoded representation of a block of pixels to get a set of quantized and transformed residual errors. These residual errors are dequantized by inverse quantizer 1162 and inverse transformed by inverse transformer 1163 to provide a set of residual errors.

These residual errors are added by adder 1164 to the pixel values of a reference block of pixels. The reference block is determined by a motion estimator/compensator 1167 or intra predictor 1166, depending on whether inter or intra prediction is performed. Selector 1168 is thereby interconnected to adder 1164 and motion estimator/compensator 1167 and intra predictor 1166. The resulting decoded block of pixels output form adder 1164 is input to deblocking filter 1000 according to some embodiments of inventive concepts to provide deblocking filtering of blocking artifacts. The filtered block of pixels is output from decoder 1160 and may be furthermore temporarily provided to frame buffer 1165 to be used as a reference block of pixels for a subsequent block of pixels to be decoded. Frame buffer 1165 is thereby connected to motion estimator/compensator 1167 to make the stored blocks of pixels available to motion estimator/compensator 1167.

The output from adder 1164 may also be input to intra predictor 1166 to be used as an unfiltered reference block of pixels.

In embodiments of FIGS. 10-11, deblocking filter 1000 may perform deblocking filtering as so called in-loop filtering. In alternative embodiments at decoder 1160, deblocking filter 1000 may be arranged to perform so called post-processing filtering. In such a case, deblocking filter 1000 operates on the output frames outside of the loop formed by adder 1164, frame buffer 1165, intra predictor 1166, motion estimator/compensator 1167, and selector 1168. In such embodiments, no deblocking filtering is typically done at the encoder. Operations of deblocking filter 1000 will be discussed in greater detail below.

According to some embodiments of inventive concepts, a deblocking filter may reduce blocking artifacts by interpolating boundary samples from a first side of the block boundary to a second side of the block boundary without significant modifications of the low frequency components in the signal (such as a ramp).

For both sides of the block boundary, the interpolation may be performed using a determined sample value at a position further away from the block boundary than the sample furthest away from the block boundary to be filtered to a determined sample value at a position in the middle of all samples to be filtered or at a position in between the boundary samples.

For each side of the block boundary, the interpolation of samples may be performed by interpolation between a weighted average of a first set of sample values centered in the middle of the total samples to be filtered or centered at a position in between the boundary samples and a weighted average of a second set of sample values determined at a position further away than the sample that is furthest away among the samples to be filtered.

Operations of electronic device 900 will now be discussed with reference to the flow chart of FIGS. 12-13 according to some embodiments of inventive concepts. For example, modules (also referred to as units) may be stored in memory 905 of FIG. 9, and these modules may provide instructions so that when the instructions of a module are executed by processor 903, processor 903 performs respective operations of the flow chart of FIGS. 12-13.

At block 1210, processor 903 obtains a current inter block and previously decoded inter blocks. In some examples, processor 903 receives the bit stream via communication interface 901. Each inter block of multiple previously decoded inter blocks can include a motion vector having a resolution. In some embodiments, electronic device 900 is a decoder. In additional or alternative embodiments, electronic device 900 is an encoder. In some embodiments, the set of inter blocks that includes the given number of previously decoded inter blocks can include inter blocks that are in a current picture. In additional or alternative embodiments, the set of inter blocks that includes the given number of previously decoded inter blocks can include inter blocks that are in a previously decoded picture.

At block 1220, processor 903 generates a list of motion vector predictor candidates. FIG. 13 depicts an example of a process for generating the list of motion vector predictor candidates. At block 1322, processor 903 defines a set of inter blocks that includes a given number of previously decoded inter blocks. At block 1324, processor 903 scans the inter blocks in the set of inter blocks in a given scanning order. In some embodiments, the given scanning order comprises an order of decoding of the inter blocks. At block 1326, processor 903 derives a motion vector prediction candidate using the motion vector of the inter block. In some embodiments, processor 903 can derive the motion vector prediction candidate for each of the inter blocks in the set of inter blocks.

At block 1330, processor 903 determines if a given criterion is satisfied. At block 1336, responsive to the given criterion being satisfied, processor 903 can add the motion vector prediction candidate to the list of motion vector prediction candidates without performing a comparison with existing motion vector prediction candidates that are in the list of motion vector prediction candidates. In some embodiments, the given criterion is satisfied responsive to the inter block being spatially non-adjacent the current block. Responsive to the inter block being non-adjacent the current block, processor 903 can add the motion vector prediction candidate to the list of motion vector prediction candidates without performing a comparison with existing motion vector prediction candidates that are in the list of motion vector prediction candidates. In additional or alternative embodiments, the given criterion is satisfied responsive to the inter block having a spatial distance from the current block that exceeds a spatial distance threshold. Responsive to the spatial distance between the inter block and the current block exceeding a spatial distance threshold, processor 903 can add the motion vector prediction candidate to the list of motion vector prediction candidates without performing a comparison with existing motion vector prediction candidates that are in the list of motion vector prediction candidates. In additional or alternative embodiments, the given criterion is satisfied responsive to the inter block being from a different picture than a picture that includes the current block. In additional or alternative embodiments, the given criterion is satisfied responsive to the motion vector prediction candidate of the inter block is included in a history based motion vector prediction, HMVP, table. In additional or alternative embodiments, the given criterion is satisfied responsive to any of the components of the motion vector prediction of the current block exceed a given motion vector prediction component threshold. In additional or alternative embodiments, the given criterion is satisfied responsive to a resolution of the motion vector prediction candidate exceeding a resolution threshold.

In additional or alternative embodiments, processor 903 can increment a comparison count value for each occurrence of a motion vector prediction candidate comparison. The given criterion can be satisfied responsive to the comparison count value exceeding a comparison count value threshold. In some examples, the comparison count value threshold is less than a size of the list of motion vector prediction candidates.

At block 1334, responsive to the criterion not being satisfied, processor 903 performs a motion vector comparison operation to compare the motion vector prediction candidate with existing motion vector prediction candidates that are in the list of motion vector prediction candidates corresponding to a current block. In some embodiments, responsive to performing the motion vector comparison operation and determining that the motion vector prediction candidate does not match any of the existing motion vector prediction candidates that are in the list of motion vector prediction candidates, processor 903 adds the motion vector prediction candidate to the list of motion vector prediction candidates. In additional or alternative embodiments, responsive to performing the motion vector comparison operation and determining that the motion vector prediction candidate matches one of the existing motion vector prediction candidates that are in the list of motion vector prediction candidates, processor 903 may not add the motion vector prediction candidate to the list of motion vector prediction candidates.

In some embodiments, processor 903 can determine a resolution of the inter block. Responsive to the resolution of the inter block being different from a resolution of the motion vector prediction candidate, processor 903 can perform a conversion of the motion vector prediction candidate to match the resolution of the inter block. Processor 903 can decode video data that includes a video sequence of pictures based on generating the list of motion vector predictor candidates that is used to predict the motion vector that is associated with the corresponding inter block.

Figure 12:
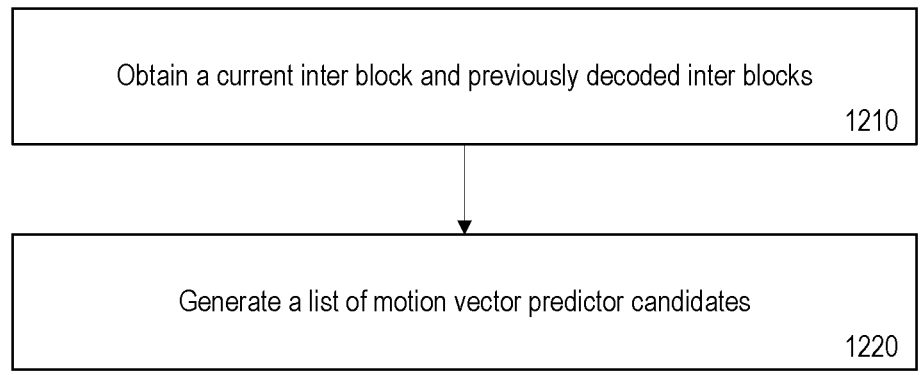
FIG. 12 is a flow chart illustrating an example of a process according to some embodiments of the present disclosure.
Figure 13:
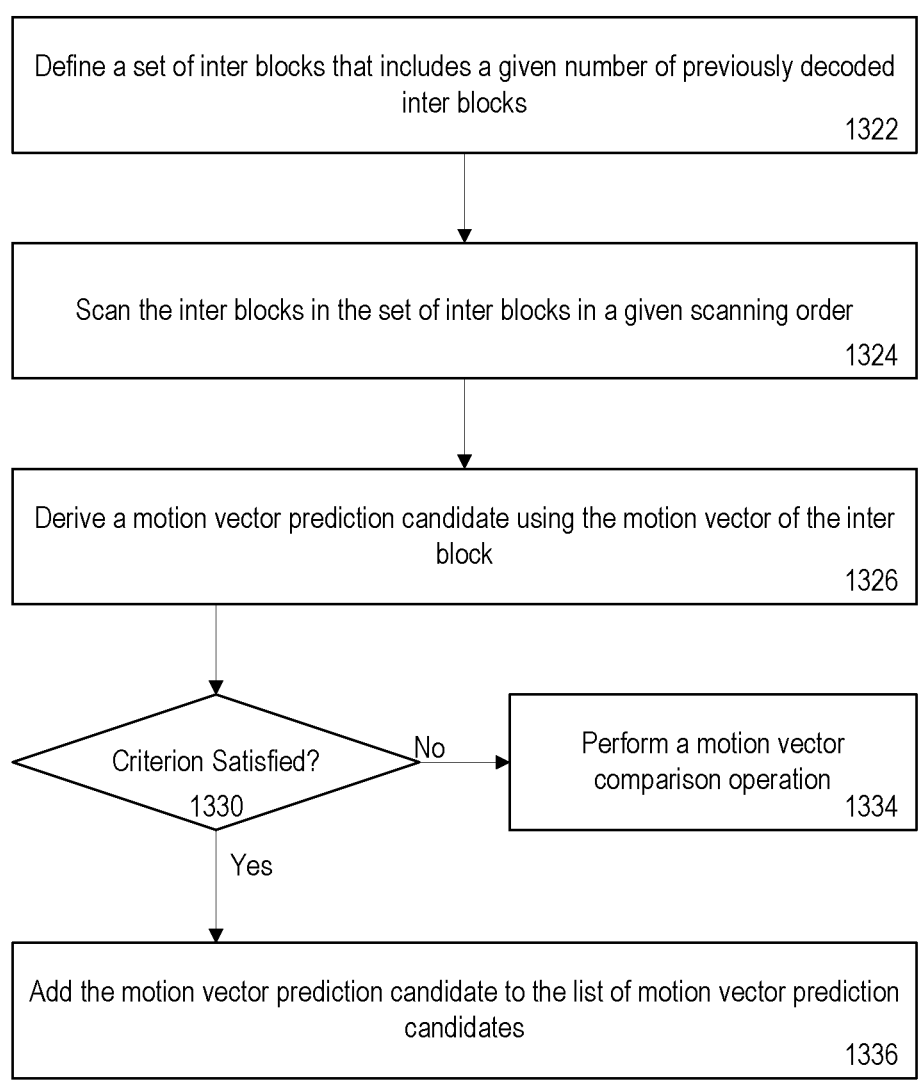
FIG. 13 is a flow chart illustrating an example of a process for generating a list of motion vector predictor candidates according to some embodiments of the present disclosure

Various operations of FIGS. 12-13 may be optional with respect to some embodiments.

Explanations for abbreviations from the above disclosure are provided below.

| Abbreviation | Explanation |
| --- | --- |
| MV | Motion Vector |
| 3GPP | 3$^{rd}$ Generation Partnership Project |
| 5G | 5$^{th}$ Generation Wireless Systems |
| NG | Next Generation |
| IoT | Internet of Things |
| AKA | Authentication and Key Agreement |
| UICC | Universal Integrated Circuit Card |
| SA2 | 3GPP architecture working group |
| SA3 | 3GPP security group |
| UP | User Plane |
| LTE | Long Term Evolution (4$^{th}$ Generation Wireless System) |
| CP | Control Plane |
| AS | Access Stratum |
| eNB | Evolved Node B |
| UE | User Equipment or End User Device |
| SMC | Security Mode Command |
| RRC | Radio Resource Control |
| PDCP | Packet Data Convergence Protocol |
| RAN | Radio Access Network |
| CN | Core Network |
| PDU | Packet Data Unit |
| DRB | Data Radio Bearer |
| AN | Access Network |
| (R)AN | Both 3GPP and non-3GPP Access Networks |
| NAS | Network Access Stratum |
| AMF | Access and Mobility Management Function |
| NF | Network Function |
| UDM | Unified Data Management |
| PCF | Policy Control Function |
| DRB-IP | Data Radio Bearer Integrity Protected |
| IE | Information Element |
| QoS | Quality of Service |
| gNB | Base Station in 5G |
| NEF | Network Exposure Function |
| NWDAF | Network Data Analytics Function |
| PCF | Policy Control Function |
| UDM | Unified Data Management |
| UPF | User Plane Function |
| DL | Downlink |
| UL | Uplink |
| LLS | Lower Layer Split |
| LLS-U | Lower Layer Split User Plane |
| LLS-C | Lower Layer Split Control Plane |
| LLS-CU | Lower Layer Split Central Unit |
| PHY | Physical Layer |
| MP | Management Plane |
| SSM | Synchronization Status Message |
| TRX | Transceiver |

Further definitions and embodiments are discussed below.

In the above-description of various embodiments of present inventive concepts, it is to be understood that the terminology used herein is for the purpose of describing particular embodiments only and is not intended to be limiting of present inventive concepts. Unless otherwise defined, all terms (including technical and scientific terms) used herein have the same meaning as commonly understood by one of ordinary skill in the art to which present inventive concepts belong. It will be further understood that terms, such as those defined in commonly used dictionaries, should be interpreted as having a meaning that is consistent with their meaning in the context of this specification and the relevant art and will not be interpreted in an idealized or overly formal sense unless expressly so defined herein.

When an element is referred to as being "connected", "coupled", "responsive", or variants thereof to another element, it can be directly connected, coupled, or responsive to the other element or intervening elements may be present. In contrast, when an element is referred to as being "directly connected", "directly coupled", "directly responsive", or variants thereof to another element, there are no intervening elements present. Like numbers refer to like elements throughout. Furthermore, "coupled", "connected", "responsive", or variants thereof as used herein may include wirelessly coupled, connected, or responsive. As used herein, the singular forms "a", "an" and "the" are intended to include the plural forms as well, unless the context clearly indicates otherwise. Well-known functions or constructions may not be described in detail for brevity and/or clarity. The term "and/or" includes any and all combinations of one or more of the associated listed items.

It will be understood that although the terms first, second, third, etc. may be used herein to describe various elements/operations, these elements/operations should not be limited by these terms. These terms are only used to distinguish one element/operation from another element/operation. Thus, a first element/operation in some embodiments could be termed a second element/operation in other embodiments without departing from the teachings of present inventive concepts. The same reference numerals or the same reference designators denote the same or similar elements throughout the specification.

As used herein, the terms "comprise", "comprising", "comprises", "include", "including", "includes", "have", "has", "having", or variants thereof are open-ended, and include one or more stated features, integers, elements, steps, components, or functions but does not preclude the presence or addition of one or more other features, integers, elements, steps, components, functions, or groups thereof. Furthermore, as used herein, the common abbreviation "e.g.", which derives from the Latin phrase "exempli gratia," may be used to introduce or specify a general example or examples of a previously mentioned item and is not intended to be limiting of such item. The common abbreviation "i.e.", which derives from the Latin phrase "id est," may be used to specify a particular item from a more general recitation.

Example embodiments are described herein with reference to block diagrams and/or flowchart illustrations of computer-implemented methods, apparatus (systems and/or devices) and/or computer program products. It is understood that a block of the block diagrams and/or flowchart illustrations, and combinations of blocks in the block diagrams and/or flowchart illustrations, can be implemented by computer program instructions that are performed by one or more computer circuits. These computer program instructions may be provided to a processor circuit of a general purpose computer circuit, special purpose computer circuit, and/or other programmable data processing circuit to produce a machine, such that the instructions, which execute via the processor of the computer and/or other programmable data processing apparatus, transform and control transistors, values stored in memory locations, and other hardware components within such circuitry to implement the functions/acts specified in the block diagrams and/or flowchart block or blocks, and thereby create means (functionality) and/or structure for implementing the functions/acts specified in the block diagrams and/or flowchart block(s).

These computer program instructions may also be stored in a tangible computer-readable medium that can direct a computer or other programmable data processing apparatus to function in a particular manner, such that the instructions stored in the computer-readable medium produce an article of manufacture including instructions which implement the functions/acts specified in the block diagrams and/or flowchart block or blocks. Accordingly, embodiments of present inventive concepts may be embodied in hardware and/or in software (including firmware, resident software, microcode, etc.) that runs on a processor such as a digital signal processor, which may collectively be referred to as "circuitry," "a module" or variants thereof.

It should also be noted that in some alternate implementations, the functions/acts noted in the blocks may occur out of the order noted in the flowcharts. For example, two blocks shown in succession may in fact be executed substantially concurrently or the blocks may sometimes be executed in the reverse order, depending upon the functionality/acts involved. Moreover, the functionality of a given block of the flowcharts and/or block diagrams may be separated into multiple blocks and/or the functionality of two or more blocks of the flowcharts and/or block diagrams may be at least partially integrated. Finally, other blocks may be added/inserted between the blocks that are illustrated, and/or blocks/operations may be omitted without departing from the scope of inventive concepts. Moreover, although some of the diagrams include arrows on communication paths to show a primary direction of communication, it is to be understood that communication may occur in the opposite direction to the depicted arrows.

Many variations and modifications can be made to the embodiments without substantially departing from the principles of the present inventive concepts. All such variations and modifications are intended to be included herein within the scope of present inventive concepts. Accordingly, the above disclosed subject matter is to be considered illustrative, and not restrictive, and the examples of embodiments are intended to cover all such modifications, enhancements, and other embodiments, which fall within the spirit and scope of present inventive concepts. Thus, to the maximum extent allowed by law, the scope of present inventive concepts are to be determined by the broadest permissible interpretation of the present disclosure including the examples of embodiments and their equivalents, and shall not be restricted or limited by the foregoing detailed description.

Additional explanation is provided below.

Generally, all terms used herein are to be interpreted according to their ordinary meaning in the relevant technical field, unless a different meaning is clearly given and/or is implied from the context in which it is used. All references to a/an/the element, apparatus, component, means, step, etc. are to be interpreted openly as referring to at least one instance of the element, apparatus, component, means, step, etc., unless explicitly stated otherwise. The steps of any methods disclosed herein do not have to be performed in the exact order disclosed, unless a step is explicitly described as following or preceding another step and/or where it is implicit that a step must follow or precede another step. Any feature of any of the embodiments disclosed herein may be applied to any other embodiment, wherever appropriate. Likewise, any advantage of any of the embodiments may apply to any other embodiments, and vice versa. Other objectives, features and advantages of the enclosed embodiments will be apparent from the following description.

Some of the embodiments contemplated herein will now be described more fully with reference to the accompanying drawings. Other embodiments, however, are contained within the scope of the subject matter disclosed herein, the disclosed subject matter should not be construed as limited to only the embodiments set forth herein; rather, these embodiments are provided by way of example to convey the scope of the subject matter to those skilled in the art.

Figure 14:
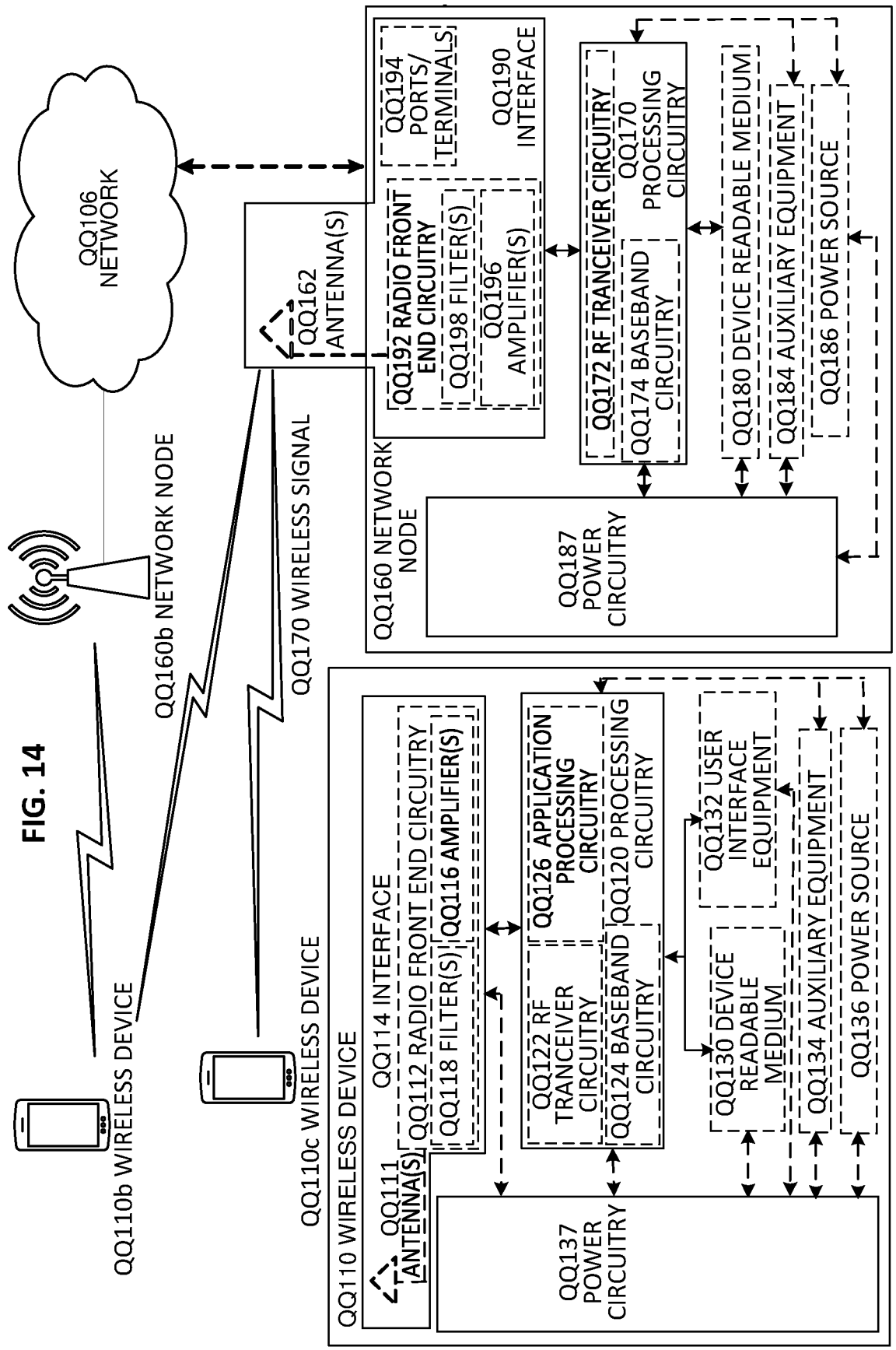
FIG. 14 is a block diagram of a wireless network in accordance with some embodiments.

FIG. 14: A wireless network in accordance with some embodiments.

Although the subject matter described herein may be implemented in any appropriate type of system using any suitable components, the embodiments disclosed herein are described in relation to a wireless network, such as the example wireless network illustrated in FIG. 14. For simplicity, the wireless network of FIG. 14 only depicts network QQ106, network nodes QQ160 and QQ160b, and WDs QQ110, QQ110b, and QQ110c (also referred to as mobile terminals). In practice, a wireless network may further include any additional elements suitable to support communication between wireless devices or between a wireless device and another communication device, such as a landline telephone, a service provider, or any other network node or end device. Of the illustrated components, network node QQ160 and wireless device (WD) QQ110 are depicted with additional detail. The wireless network may provide communication and other types of services to one or more wireless devices to facilitate the wireless devices' access to and/or use of the services provided by, or via, the wireless network.

The wireless network may comprise and/or interface with any type of communication, telecommunication, data, cellular, and/or radio network or other similar type of system. In some embodiments, the wireless network may be configured to operate according to specific standards or other types of predefined rules or procedures. Thus, particular embodiments of the wireless network may implement communication standards, such as Global System for Mobile Communications (GSM), Universal Mobile Telecommunications System (UMTS), Long Term Evolution (LTE), and/or other suitable 2G, 3G, 4G, or 5G standards; wireless local area network (WLAN) standards, such as the IEEE 802.11 standards; and/or any other appropriate wireless communication standard, such as the Worldwide Interoperability for Microwave Access (WiMax), Bluetooth, Z-Wave and/or ZigBee standards.

Network QQ106 may comprise one or more backhaul networks, core networks, IP networks, public switched telephone networks (PSTNs), packet data networks, optical networks, wide-area networks (WANs), local area networks (LANs), wireless local area networks (WLANs), wired networks, wireless networks, metropolitan area networks, and other networks to enable communication between devices.

Network node QQ160 and WD QQ110 comprise various components described in more detail below. These components work together in order to provide network node and/or wireless device functionality, such as providing wireless connections in a wireless network. In different embodiments, the wireless network may comprise any number of wired or wireless networks, network nodes, base stations, controllers, wireless devices, relay stations, and/or any other components or systems that may facilitate or participate in the communication of data and/or signals whether via wired or wireless connections.

As used herein, network node refers to equipment capable, configured, arranged and/or operable to communicate directly or indirectly with a wireless device and/or with other network nodes or equipment in the wireless network to enable and/or provide wireless access to the wireless device and/or to perform other functions (e.g., administration) in the wireless network. Examples of network nodes include, but are not limited to, access points (APs) (e.g., radio access points), base stations (BSs) (e.g., radio base stations, Node Bs, evolved Node Bs (eNBs) and NR NodeBs (gNBs)). Base stations may be categorized based on the amount of coverage they provide (or, stated differently, their transmit power level) and may then also be referred to as femto base stations, pico base stations, micro base stations, or macro base stations. A base station may be a relay node or a relay donor node controlling a relay. A network node may also include one or more (or all) parts of a distributed radio base station such as centralized digital units and/or remote radio units (RRUs), sometimes referred to as Remote Radio Heads (RRHs). Such remote radio units may or may not be integrated with an antenna as an antenna integrated radio. Parts of a distributed radio base station may also be referred to as nodes in a distributed antenna system (DAS). Yet further examples of network nodes include multi-standard radio (MSR) equipment such as MSR BSs, network controllers such as radio network controllers (RNCs) or base station controllers (BSCs), base transceiver stations (BTSs), transmission points, transmission nodes, multi-cell/multi-cast coordination entities (MCEs), core network nodes (e.g., MSCs, MMEs), O&M nodes, OSS nodes, SON nodes, positioning nodes (e.g., E-SMLCs), and/or MDTs. As another example, a network node may be a virtual network node as described in more detail below. More generally, however, network nodes may represent any suitable device (or group of devices) capable, configured, arranged, and/or operable to enable and/or provide a wireless device with access to the wireless network or to provide some service to a wireless device that has accessed the wireless network.

In FIG. 14, network node QQ160 includes processing circuitry QQ170, device readable medium QQ180, interface QQ190, auxiliary equipment QQ184, power source QQ186, power circuitry QQ187, and antenna QQ162. Although network node QQ160 illustrated in the example wireless network of FIG. 14 may represent a device that includes the illustrated combination of hardware components, other embodiments may comprise network nodes with different combinations of components. It is to be understood that a network node comprises any suitable combination of hardware and/or software needed to perform the tasks, features, functions and methods disclosed herein. Moreover, while the components of network node QQ160 are depicted as single boxes located within a larger box, or nested within multiple boxes, in practice, a network node may comprise multiple different physical components that make up a single illustrated component (e.g., device readable medium QQ180 may comprise multiple separate hard drives as well as multiple RAM modules).

Similarly, network node QQ160 may be composed of multiple physically separate components (e.g., a NodeB component and a RNC component, or a BTS component and a BSC component, etc.), which may each have their own respective components. In certain scenarios in which network node QQ160 comprises multiple separate components (e.g., BTS and BSC components), one or more of the separate components may be shared among several network nodes. For example, a single RNC may control multiple NodeB's. In such a scenario, each unique NodeB and RNC pair, may in some instances be considered a single separate network node. In some embodiments, network node QQ160 may be configured to support multiple radio access technologies (RATs). In such embodiments, some components may be duplicated (e.g., separate device readable medium QQ180 for the different RATs) and some components may be reused (e.g., the same antenna QQ162 may be shared by the RATs). Network node QQ160 may also include multiple sets of the various illustrated components for different wireless technologies integrated into network node QQ160, such as, for example, GSM, WCDMA, LTE, NR, WiFi, or Bluetooth wireless technologies. These wireless technologies may be integrated into the same or different chip or set of chips and other components within network node QQ160.

Processing circuitry QQ170 is configured to perform any determining, calculating, or similar operations (e.g., certain obtaining operations) described herein as being provided by a network node. These operations performed by processing circuitry QQ170 may include processing information obtained by processing circuitry QQ170 by, for example, converting the obtained information into other information, comparing the obtained information or converted information to information stored in the network node, and/or performing one or more operations based on the obtained information or converted information, and as a result of said processing making a determination.

Processing circuitry QQ170 may comprise a combination of one or more of a microprocessor, controller, microcontroller, central processing unit, digital signal processor, application-specific integrated circuit, field programmable gate array, or any other suitable computing device, resource, or combination of hardware, software and/or encoded logic operable to provide, either alone or in conjunction with other network node QQ160 components, such as device readable medium QQ180, network node QQ160 functionality. For example, processing circuitry QQ170 may execute instructions stored in device readable medium QQ180 or in memory within processing circuitry QQ170. Such functionality may include providing any of the various wireless features, functions, or benefits discussed herein. In some embodiments, processing circuitry QQ170 may include a system on a chip (SOC).

In some embodiments, processing circuitry QQ170 may include one or more of radio frequency (RF) transceiver circuitry QQ172 and baseband processing circuitry QQ174. In some embodiments, radio frequency (RF) transceiver circuitry QQ172 and baseband processing circuitry QQ174 may be on separate chips (or sets of chips), boards, or units, such as radio units and digital units. In alternative embodiments, part or all of RF transceiver circuitry QQ172 and baseband processing circuitry QQ174 may be on the same chip or set of chips, boards, or units.

In certain embodiments, some or all of the functionality described herein as being provided by a network node, base station, eNB or other such network device may be performed by processing circuitry QQ170 executing instructions stored on device readable medium QQ180 or memory within processing circuitry QQ170. In alternative embodiments, some or all of the functionality may be provided by processing circuitry QQ170 without executing instructions stored on a separate or discrete device readable medium, such as in a hard-wired manner. In any of those embodiments, whether executing instructions stored on a device readable storage medium or not, processing circuitry QQ170 can be configured to perform the described functionality. The benefits provided by such functionality are not limited to processing circuitry QQ170 alone or to other components of network node QQ160, but are enjoyed by network node QQ160 as a whole, and/or by end users and the wireless network generally.

Device readable medium QQ180 may comprise any form of volatile or non-volatile computer readable memory including, without limitation, persistent storage, solid-state memory, remotely mounted memory, magnetic media, optical media, random access memory (RAM), read-only memory (ROM), mass storage media (for example, a hard disk), removable storage media (for example, a flash drive, a Compact Disk (CD) or a Digital Video Disk (DVD)), and/or any other volatile or non-volatile, non-transitory device readable and/or computer-executable memory devices that store information, data, and/or instructions that may be used by processing circuitry QQ170. Device readable medium QQ180 may store any suitable instructions, data or information, including a computer program, software, an application including one or more of logic, rules, code, tables, etc. and/or other instructions capable of being executed by processing circuitry QQ170 and, utilized by network node QQ160. Device readable medium QQ180 may be used to store any calculations made by processing circuitry QQ170 and/or any data received via interface QQ190. In some embodiments, processing circuitry QQ170 and device readable medium QQ180 may be considered to be integrated.

Interface QQ190 is used in the wired or wireless communication of signalling and/or data between network node QQ160, network QQ106, and/or WDs QQ110. As illustrated, interface QQ190 comprises port(s)/terminal(s) QQ194 to send and receive data, for example to and from network QQ106 over a wired connection. Interface QQ190 also includes radio front end circuitry QQ192 that may be coupled to, or in certain embodiments a part of, antenna QQ162. Radio front end circuitry QQ192 comprises filters QQ198 and amplifiers QQ196. Radio front end circuitry QQ192 may be connected to antenna QQ162 and processing circuitry QQ170. Radio front end circuitry may be configured to condition signals communicated between antenna QQ162 and processing circuitry QQ170. Radio front end circuitry QQ192 may receive digital data that is to be sent out to other network nodes or WDs via a wireless connection. Radio front end circuitry QQ192 may convert the digital data into a radio signal having the appropriate channel and bandwidth parameters using a combination of filters QQ198 and/or amplifiers QQ196. The radio signal may then be transmitted via antenna QQ162. Similarly, when receiving data, antenna QQ162 may collect radio signals which are then converted into digital data by radio front end circuitry QQ192. The digital data may be passed to processing circuitry QQ170. In other embodiments, the interface may comprise different components and/or different combinations of components.

In certain alternative embodiments, network node QQ160 may not include separate radio front end circuitry QQ192, instead, processing circuitry QQ170 may comprise radio front end circuitry and may be connected to antenna QQ162 without separate radio front end circuitry QQ192. Similarly, in some embodiments, all or some of RF transceiver circuitry QQ172 may be considered a part of interface QQ190. In still other embodiments, interface QQ190 may include one or more ports or terminals QQ194, radio front end circuitry QQ192, and RF transceiver circuitry QQ172, as part of a radio unit (not shown), and interface QQ190 may communicate with baseband processing circuitry QQ174, which is part of a digital unit (not shown).

Antenna QQ162 may include one or more antennas, or antenna arrays, configured to send and/or receive wireless signals. Antenna QQ162 may be coupled to radio front end circuitry QQ190 and may be any type of antenna capable of transmitting and receiving data and/or signals wirelessly. In some embodiments, antenna QQ162 may comprise one or more omni-directional, sector or panel antennas operable to transmit/receive radio signals between, for example, 2 GHz and 66 GHz. An omni-directional antenna may be used to transmit/receive radio signals in any direction, a sector antenna may be used to transmit/receive radio signals from devices within a particular area, and a panel antenna may be a line of sight antenna used to transmit/receive radio signals in a relatively straight line. In some instances, the use of more than one antenna may be referred to as MIMO. In certain embodiments, antenna QQ162 may be separate from network node QQ160 and may be connectable to network node QQ160 through an interface or port.

Antenna QQ162, interface QQ190, and/or processing circuitry QQ170 may be configured to perform any receiving operations and/or certain obtaining operations described herein as being performed by a network node. Any information, data and/or signals may be received from a wireless device, another network node and/or any other network equipment. Similarly, antenna QQ162, interface QQ190, and/or processing circuitry QQ170 may be configured to perform any transmitting operations described herein as being performed by a network node. Any information, data and/or signals may be transmitted to a wireless device, another network node and/or any other network equipment.

Power circuitry QQ187 may comprise, or be coupled to, power management circuitry and is configured to supply the components of network node QQ160 with power for performing the functionality described herein. Power circuitry QQ187 may receive power from power source QQ186. Power source QQ186 and/or power circuitry QQ187 may be configured to provide power to the various components of network node QQ160 in a form suitable for the respective components (e.g., at a voltage and current level needed for each respective component). Power source QQ186 may either be included in, or external to, power circuitry QQ187 and/or network node QQ160. For example, network node QQ160 may be connectable to an external power source (e.g., an electricity outlet) via an input circuitry or interface such as an electrical cable, whereby the external power source supplies power to power circuitry QQ187. As a further example, power source QQ186 may comprise a source of power in the form of a battery or battery pack which is connected to, or integrated in, power circuitry QQ187. The battery may provide backup power should the external power source fail. Other types of power sources, such as photovoltaic devices, may also be used.

Alternative embodiments of network node QQ160 may include additional components beyond those shown in FIG. 14 that may be responsible for providing certain aspects of the network node's functionality, including any of the functionality described herein and/or any functionality necessary to support the subject matter described herein. For example, network node QQ160 may include user interface equipment to allow input of information into network node QQ160 and to allow output of information from network node QQ160. This may allow a user to perform diagnostic, maintenance, repair, and other administrative functions for network node QQ160.

As used herein, wireless device (WD) refers to a device capable, configured, arranged and/or operable to communicate wirelessly with network nodes and/or other wireless devices. Unless otherwise noted, the term WD may be used interchangeably herein with user equipment (UE). Communicating wirelessly may involve transmitting and/or receiving wireless signals using electromagnetic waves, radio waves, infrared waves, and/or other types of signals suitable for conveying information through air. In some embodiments, a WD may be configured to transmit and/or receive information without direct human interaction. For instance, a WD may be designed to transmit information to a network on a predetermined schedule, when triggered by an internal or external event, or in response to requests from the network. Examples of a WD include, but are not limited to, a smart phone, a mobile phone, a cell phone, a voice over IP (VoIP) phone, a wireless local loop phone, a desktop computer, a personal digital assistant (PDA), a wireless cameras, a gaming console or device, a music storage device, a playback appliance, a wearable terminal device, a wireless endpoint, a mobile station, a tablet, a laptop, a laptop-embedded equipment (LEE), a laptop-mounted equipment (LME), a smart device, a wireless customer-premise equipment (CPE). a vehicle-mounted wireless terminal device, etc. A WD may support device-to-device (D2D) communication, for example by implementing a 3GPP standard for sidelink communication, vehicle-to-vehicle (V2V), vehicle-to-infrastructure (V2I), vehicle-to-everything (V2X) and may in this case be referred to as a D2D communication device. As yet another specific example, in an Internet of Things (IoT) scenario, a WD may represent a machine or other device that performs monitoring and/or measurements, and transmits the results of such monitoring and/or measurements to another WD and/or a network node. The WD may in this case be a machine-to-machine (M2M) device, which may in a 3GPP context be referred to as an MTC device. As one particular example, the WD may be a UE implementing the 3GPP narrow band internet of things (NB-IoT) standard. Particular examples of such machines or devices are sensors, metering devices such as power meters, industrial machinery, or home or personal appliances (e.g. refrigerators, televisions, etc.) personal wearables (e.g., watches, fitness trackers, etc.). In other scenarios, a WD may represent a vehicle or other equipment that is capable of monitoring and/or reporting on its operational status or other functions associated with its operation. A WD as described above may represent the endpoint of a wireless connection, in which case the device may be referred to as a wireless terminal. Furthermore, a WD as described above may be mobile, in which case it may also be referred to as a mobile device or a mobile terminal.

As illustrated, wireless device QQ110 includes antenna QQ111, interface QQ114, processing circuitry QQ120, device readable medium QQ130, user interface equipment QQ132, auxiliary equipment QQ134, power source QQ136 and power circuitry QQ137. WD QQ110 may include multiple sets of one or more of the illustrated components for different wireless technologies supported by WD QQ110, such as, for example, GSM, WCDMA, LTE, NR, WiFi, WiMAX, or Bluetooth wireless technologies, just to mention a few. These wireless technologies may be integrated into the same or different chips or set of chips as other components within WD QQ110.

Antenna QQ111 may include one or more antennas or antenna arrays, configured to send and/or receive wireless signals, and is connected to interface QQ114. In certain alternative embodiments, antenna QQ111 may be separate from WD QQ110 and be connectable to WD QQ110 through an interface or port. Antenna QQ111, interface QQ114, and/or processing circuitry QQ120 may be configured to perform any receiving or transmitting operations described herein as being performed by a WD. Any information, data and/or signals may be received from a network node and/or another WD. In some embodiments, radio front end circuitry and/or antenna QQ111 may be considered an interface.

As illustrated, interface QQ114 comprises radio front end circuitry QQ112 and antenna QQ111. Radio front end circuitry QQ112 comprise one or more filters QQ118 and amplifiers QQ116. Radio front end circuitry QQ114 is connected to antenna QQ111 and processing circuitry QQ120, and is configured to condition signals communicated between antenna QQ111 and processing circuitry QQ120. Radio front end circuitry QQ112 may be coupled to or a part of antenna QQ111. In some embodiments, WD QQ110 may not include separate radio front end circuitry QQ112; rather, processing circuitry QQ120 may comprise radio front end circuitry and may be connected to antenna QQ111. Similarly, in some embodiments, some or all of RF transceiver circuitry QQ122 may be considered a part of interface QQ114. Radio front end circuitry QQ112 may receive digital data that is to be sent out to other network nodes or WDs via a wireless connection. Radio front end circuitry QQ112 may convert the digital data into a radio signal having the appropriate channel and bandwidth parameters using a combination of filters QQ118 and/or amplifiers QQ116. The radio signal may then be transmitted via antenna QQ111. Similarly, when receiving data, antenna QQ111 may collect radio signals which are then converted into digital data by radio front end circuitry QQ112. The digital data may be passed to processing circuitry QQ120. In other embodiments, the interface may comprise different components and/or different combinations of components.

Processing circuitry QQ120 may comprise a combination of one or more of a microprocessor, controller, microcontroller, central processing unit, digital signal processor, application-specific integrated circuit, field programmable gate array, or any other suitable computing device, resource, or combination of hardware, software, and/or encoded logic operable to provide, either alone or in conjunction with other WD QQ110 components, such as device readable medium QQ130, WD QQ110 functionality. Such functionality may include providing any of the various wireless features or benefits discussed herein. For example, processing circuitry QQ120 may execute instructions stored in device readable medium QQ130 or in memory within processing circuitry QQ120 to provide the functionality disclosed herein.

As illustrated, processing circuitry QQ120 includes one or more of RF transceiver circuitry QQ122, baseband processing circuitry QQ124, and application processing circuitry QQ126. In other embodiments, the processing circuitry may comprise different components and/or different combinations of components. In certain embodiments processing circuitry QQ120 of WD QQ110 may comprise a SOC. In some embodiments, RF transceiver circuitry QQ122, baseband processing circuitry QQ124, and application processing circuitry QQ126 may be on separate chips or sets of chips. In alternative embodiments, part or all of baseband processing circuitry QQ124 and application processing circuitry QQ126 may be combined into one chip or set of chips, and RF transceiver circuitry QQ122 may be on a separate chip or set of chips. In still alternative embodiments, part or all of RF transceiver circuitry QQ122 and baseband processing circuitry QQ124 may be on the same chip or set of chips, and application processing circuitry QQ126 may be on a separate chip or set of chips. In yet other alternative embodiments, part or all of RF transceiver circuitry QQ122, baseband processing circuitry QQ124, and application processing circuitry QQ126 may be combined in the same chip or set of chips. In some embodiments, RF transceiver circuitry QQ122 may be a part of interface QQ114. RF transceiver circuitry QQ122 may condition RF signals for processing circuitry QQ120.

In certain embodiments, some or all of the functionality described herein as being performed by a WD may be provided by processing circuitry QQ120 executing instructions stored on device readable medium QQ130, which in certain embodiments may be a computer-readable storage medium. In alternative embodiments, some or all of the functionality may be provided by processing circuitry QQ120 without executing instructions stored on a separate or discrete device readable storage medium, such as in a hard-wired manner. In any of those particular embodiments, whether executing instructions stored on a device readable storage medium or not, processing circuitry QQ120 can be configured to perform the described functionality. The benefits provided by such functionality are not limited to processing circuitry QQ120 alone or to other components of WD QQ110, but are enjoyed by WD QQ110 as a whole, and/or by end users and the wireless network generally.

Processing circuitry QQ120 may be configured to perform any determining, calculating, or similar operations (e.g., certain obtaining operations) described herein as being performed by a WD. These operations, as performed by processing circuitry QQ120, may include processing information obtained by processing circuitry QQ120 by, for example, converting the obtained information into other information, comparing the obtained information or converted information to information stored by WD QQ110, and/or performing one or more operations based on the obtained information or converted information, and as a result of said processing making a determination.

Device readable medium QQ130 may be operable to store a computer program, software, an application including one or more of logic, rules, code, tables, etc. and/or other instructions capable of being executed by processing circuitry QQ120. Device readable medium QQ130 may include computer memory (e.g., Random Access Memory (RAM) or Read Only Memory (ROM)), mass storage media (e.g., a hard disk), removable storage media (e.g., a Compact Disk (CD) or a Digital Video Disk (DVD)), and/or any other volatile or non-volatile, non-transitory device readable and/or computer executable memory devices that store information, data, and/or instructions that may be used by processing circuitry QQ120. In some embodiments, processing circuitry QQ120 and device readable medium QQ130 may be considered to be integrated. User interface equipment QQ132 may provide components that allow for a human user to interact with WD QQ110. Such interaction may be of many forms, such as visual, audial, tactile, etc. User interface equipment QQ132 may be operable to produce output to the user and to allow the user to provide input to WD QQ110. The type of interaction may vary depending on the type of user interface equipment QQ132 installed in WD QQ110. For example, if WD QQ110 is a smart phone, the interaction may be via a touch screen; if WD QQ110 is a smart meter, the interaction may be through a screen that provides usage (e.g., the number of gallons used) or a speaker that provides an audible alert (e.g., if smoke is detected). User interface equipment QQ132 may include input interfaces, devices and circuits, and output interfaces, devices and circuits. User interface equipment QQ132 is configured to allow input of information into WD QQ110, and is connected to processing circuitry QQ120 to allow processing circuitry QQ120 to process the input information. User interface equipment QQ132 may include, for example, a microphone, a proximity or other sensor, keys/buttons, a touch display, one or more cameras, a USB port, or other input circuitry. User interface equipment QQ132 is also configured to allow output of information from WD QQ110, and to allow processing circuitry QQ120 to output information from WD QQ110. User interface equipment QQ132 may include, for example, a speaker, a display, vibrating circuitry, a USB port, a headphone interface, or other output circuitry. Using one or more input and output interfaces, devices, and circuits, of user interface equipment QQ132, WD QQ110 may communicate with end users and/or the wireless network, and allow them to benefit from the functionality described herein.

Auxiliary equipment QQ134 is operable to provide more specific functionality which may not be generally performed by WDs. This may comprise specialized sensors for doing measurements for various purposes, interfaces for additional types of communication such as wired communications etc. The inclusion and type of components of auxiliary equipment QQ134 may vary depending on the embodiment and/or scenario.

Power source QQ136 may, in some embodiments, be in the form of a battery or battery pack. Other types of power sources, such as an external power source (e.g., an electricity outlet), photovoltaic devices or power cells, may also be used. WD QQ110 may further comprise power circuitry QQ137 for delivering power from power source QQ136 to the various parts of WD QQ110 which need power from power source QQ136 to carry out any functionality described or indicated herein. Power circuitry QQ137 may in certain embodiments comprise power management circuitry. Power circuitry QQ137 may additionally or alternatively be operable to receive power from an external power source; in which case WD QQ110 may be connectable to the external power source (such as an electricity outlet) via input circuitry or an interface such as an electrical power cable. Power circuitry QQ137 may also in certain embodiments be operable to deliver power from an external power source to power source QQ136. This may be, for example, for the charging of power source QQ136. Power circuitry QQ137 may perform any formatting, converting, or other modification to the power from power source QQ136 to make the power suitable for the respective components of WD QQ110 to which power is supplied.

Figure 15:
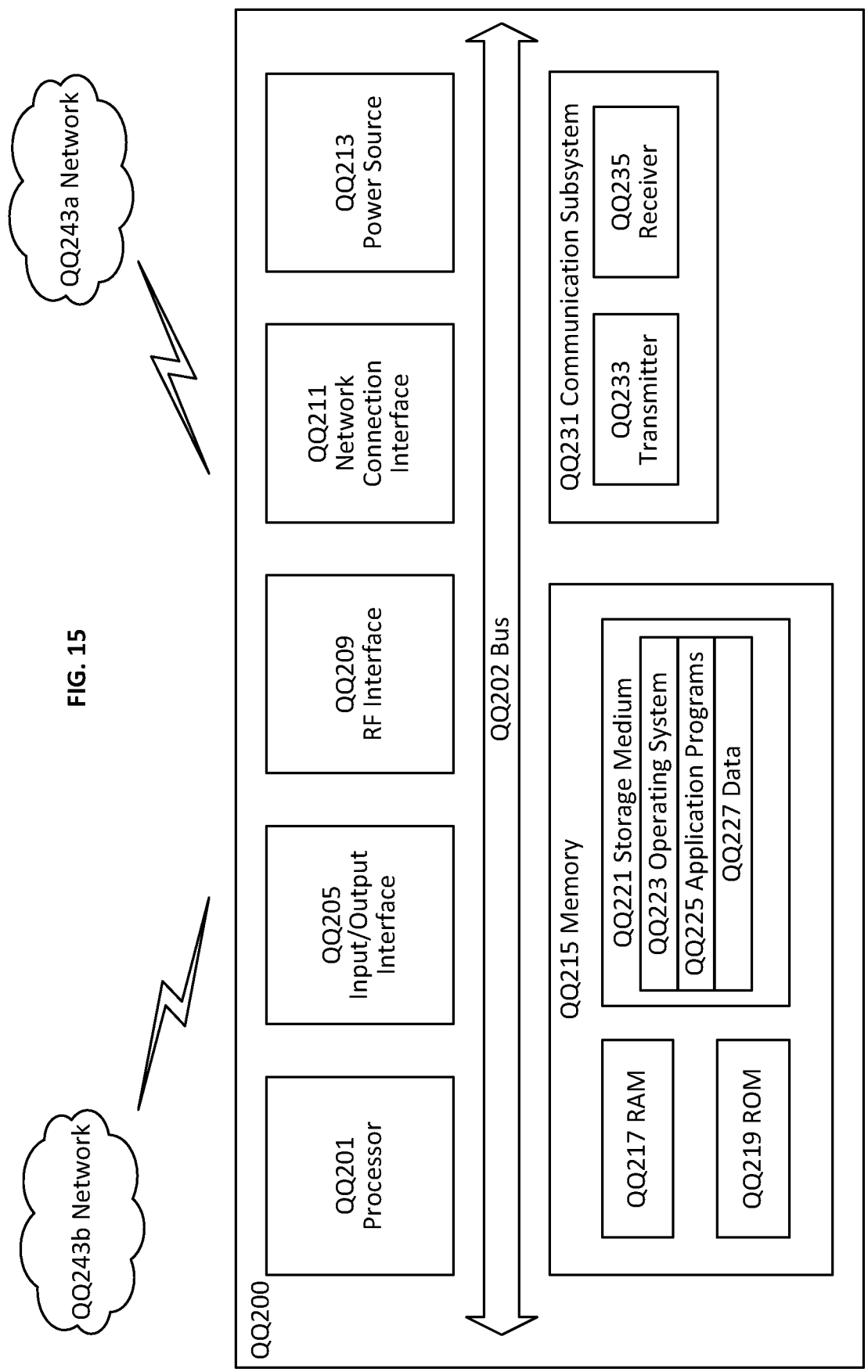
FIG. 15 is a block diagram of a user equipment in accordance with some embodiments

FIG. 15: User Equipment in accordance with some embodiments

FIG. 15 illustrates one embodiment of a UE in accordance with various aspects described herein. As used herein, a user equipment or UE may not necessarily have a user in the sense of a human user who owns and/or operates the relevant device. Instead, a UE may represent a device that is intended for sale to, or operation by, a human user but which may not, or which may not initially, be associated with a specific human user (e.g., a smart sprinkler controller). Alternatively, a UE may represent a device that is not intended for sale to, or operation by, an end user but which may be associated with or operated for the benefit of a user (e.g., a smart power meter). UE QQ2200 may be any UE identified by the 3rd Generation Partnership Project (3GPP), including a NB-IoT UE, a machine type communication (MTC) UE, and/or an enhanced MTC (eMTC) UE. UE QQ200, as illustrated in FIG. 15, is one example of a WD configured for communication in accordance with one or more communication standards promulgated by the 3rd Generation Partnership Project (3GPP), such as 3GPP's GSM, UMTS, LTE, and/or 5G standards. As mentioned previously, the term WD and UE may be used interchangeable. Accordingly, although FIG. 15 is a UE, the components discussed herein are equally applicable to a WD, and vice-versa.

In FIG. 15, UE QQ200 includes processing circuitry QQ201 that is operatively coupled to input/output interface QQ205, radio frequency (RF) interface QQ209, network connection interface QQ211, memory QQ215 including random access memory (RAM) QQ217, read-only memory (ROM) QQ219, and storage medium QQ221 or the like, communication subsystem QQ231, power source QQ233, and/or any other component, or any combination thereof. Storage medium QQ221 includes operating system QQ223, application program QQ225, and data QQ227. In other embodiments, storage medium QQ221 may include other similar types of information. Certain UEs may utilize all of the components shown in FIG. 15, or only a subset of the components. The level of integration between the components may vary from one UE to another UE. Further, certain UEs may contain multiple instances of a component, such as multiple processors, memories, transceivers, transmitters, receivers, etc.

In FIG. 15, processing circuitry QQ201 may be configured to process computer instructions and data. Processing circuitry QQ201 may be configured to implement any sequential state machine operative to execute machine instructions stored as machine-readable computer programs in the memory, such as one or more hardware-implemented state machines (e.g., in discrete logic, FPGA, ASIC, etc.); programmable logic together with appropriate firmware; one or more stored program, general-purpose processors, such as a microprocessor or Digital Signal Processor (DSP), together with appropriate software; or any combination of the above. For example, the processing circuitry QQ201 may include two central processing units (CPUs). Data may be information in a form suitable for use by a computer.

In the depicted embodiment, input/output interface QQ205 may be configured to provide a communication interface to an input device, output device, or input and output device. UE QQ200 may be configured to use an output device via input/output interface QQ205. An output device may use the same type of interface port as an input device. For example, a USB port may be used to provide input to and output from UE QQ200. The output device may be a speaker, a sound card, a video card, a display, a monitor, a printer, an actuator, an emitter, a smartcard, another output device, or any combination thereof. UE QQ200 may be configured to use an input device via input/output interface QQ205 to allow a user to capture information into UE QQ200. The input device may include a touch-sensitive or presence-sensitive display, a camera (e.g., a digital camera, a digital video camera, a web camera, etc.), a microphone, a sensor, a mouse, a trackball, a directional pad, a trackpad, a scroll wheel, a smartcard, and the like. The presence-sensitive display may include a capacitive or resistive touch sensor to sense input from a user. A sensor may be, for instance, an accelerometer, a gyroscope, a tilt sensor, a force sensor, a magnetometer, an optical sensor, a proximity sensor, another like sensor, or any combination thereof. For example, the input device may be an accelerometer, a magnetometer, a digital camera, a microphone, and an optical sensor.

In FIG. 15, RF interface QQ209 may be configured to provide a communication interface to RF components such as a transmitter, a receiver, and an antenna. Network connection interface QQ211 may be configured to provide a communication interface to network QQ243a. Network QQ243a may encompass wired and/or wireless networks such as a local-area network (LAN), a wide-area network (WAN), a computer network, a wireless network, a telecommunications network, another like network or any combination thereof. For example, network QQ243a may comprise a Wi-Fi network. Network connection interface QQ211 may be configured to include a receiver and a transmitter interface used to communicate with one or more other devices over a communication network according to one or more communication protocols, such as Ethernet, TCP/IP, SONET, ATM, or the like. Network connection interface QQ211 may implement receiver and transmitter functionality appropriate to the communication network links (e.g., optical, electrical, and the like). The transmitter and receiver functions may share circuit components, software or firmware, or alternatively may be implemented separately.

RAM QQ217 may be configured to interface via bus QQ202 to processing circuitry QQ201 to provide storage or caching of data or computer instructions during the execution of software programs such as the operating system, application programs, and device drivers. ROM QQ219 may be configured to provide computer instructions or data to processing circuitry QQ201. For example, ROM QQ219 may be configured to store invariant low-level system code or data for basic system functions such as basic input and output (I/O), startup, or reception of keystrokes from a keyboard that are stored in a non-volatile memory. Storage medium QQ221 may be configured to include memory such as RAM, ROM, programmable read-only memory (PROM), erasable programmable read-only memory (EPROM), electrically erasable programmable read-only memory (EEPROM), magnetic disks, optical disks, floppy disks, hard disks, removable cartridges, or flash drives. In one example, storage medium QQ221 may be configured to include operating system QQ223, application program QQ225 such as a web browser application, a widget or gadget engine or another application, and data file QQ227. Storage medium QQ221 may store, for use by UE QQ200, any of a variety of various operating systems or combinations of operating systems.

Storage medium QQ221 may be configured to include a number of physical drive units, such as redundant array of independent disks (RAID), floppy disk drive, flash memory, USB flash drive, external hard disk drive, thumb drive, pen drive, key drive, high-density digital versatile disc (HD-DVD) optical disc drive, internal hard disk drive, Blu-Ray optical disc drive, holographic digital data storage (HDDS) optical disc drive, external mini-dual in-line memory module (DIMM), synchronous dynamic random access memory (SDRAM), external micro-DIMM SDRAM, smartcard memory such as a subscriber identity module or a removable user identity (SIM/RUIM) module, other memory, or any combination thereof. Storage medium QQ221 may allow UE QQ200 to access computer-executable instructions, application programs or the like, stored on transitory or non-transitory memory media, to off-load data, or to upload data. An article of manufacture, such as one utilizing a communication system may be tangibly embodied in storage medium QQ221, which may comprise a device readable medium.

In FIG. 15, processing circuitry QQ201 may be configured to communicate with network QQ243b using communication subsystem QQ231. Network QQ243a and network QQ243b may be the same network or networks or different network or networks. Communication subsystem QQ231 may be configured to include one or more transceivers used to communicate with network QQ243*b*. For example, communication subsystem QQ231 may be configured to include one or more transceivers used to communicate with one or more remote transceivers of another device capable of wireless communication such as another WD, UE, or base station of a radio access network (RAN) according to one or more communication protocols, such as IEEE 802.QQ2, CDMA, WCDMA, GSM, LTE, UTRAN, WiMax, or the like. Each transceiver may include transmitter QQ233 and/or receiver QQ235 to implement transmitter or receiver functionality, respectively, appropriate to the RAN links (e.g., frequency allocations and the like). Further, transmitter QQ233 and receiver QQ235 of each transceiver may share circuit components, software or firmware, or alternatively may be implemented separately.

In the illustrated embodiment, the communication functions of communication subsystem QQ231 may include data communication, voice communication, multimedia communication, short-range communications such as Bluetooth, near-field communication, location-based communication such as the use of the global positioning system (GPS) to determine a location, another like communication function, or any combination thereof. For example, communication subsystem QQ231 may include cellular communication, Wi-Fi communication, Bluetooth communication, and GPS communication. Network QQ243*b* may encompass wired and/or wireless networks such as a local-area network (LAN), a wide-area network (WAN), a computer network, a wireless network, a telecommunications network, another like network or any combination thereof. For example, network QQ243*b* may be a cellular network, a Wi-Fi network, and/or a near-field network. Power source QQ213 may be configured to provide alternating current (AC) or direct current (DC) power to components of UE QQ200.

The features, benefits and/or functions described herein may be implemented in one of the components of UE QQ200 or partitioned across multiple components of UE QQ200. Further, the features, benefits, and/or functions described herein may be implemented in any combination of hardware, software or firmware. In one example, communication subsystem QQ231 may be configured to include any of the components described herein. Further, processing circuitry QQ201 may be configured to communicate with any of such components over bus QQ202. In another example, any of such components may be represented by program instructions stored in memory that when executed by processing circuitry QQ201 perform the corresponding functions described herein. In another example, the functionality of any of such components may be partitioned between processing circuitry QQ201 and communication subsystem QQ231. In another example, the non-computationally intensive functions of any of such components may be implemented in software or firmware and the computationally intensive functions may be implemented in hardware.

Figure 16:
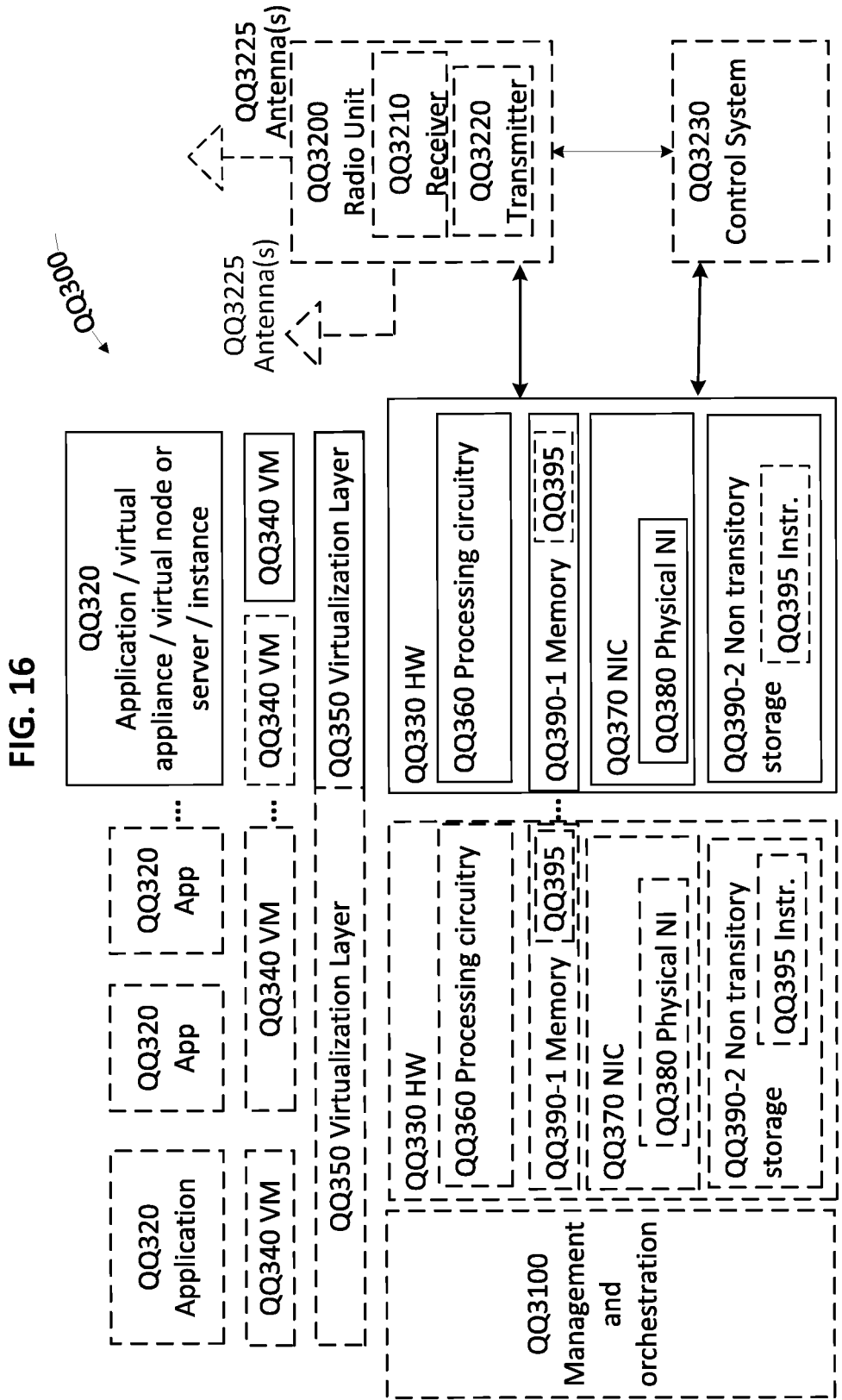
FIG. 16 is a block diagram of a virtualization environment in accordance with some embodiments.

FIG. 16: Virtualization environment in accordance with some embodiments

FIG. 16 is a schematic block diagram illustrating a virtualization environment QQ300 in which functions implemented by some embodiments may be virtualized. In the present context, virtualizing means creating virtual versions of apparatuses or devices which may include virtualizing hardware platforms, storage devices and networking resources. As used herein, virtualization can be applied to a node (e.g., a virtualized base station or a virtualized radio access node) or to a device (e.g., a UE, a wireless device or any other type of communication device) or components thereof and relates to an implementation in which at least a portion of the functionality is implemented as one or more virtual components (e.g., via one or more applications, components, functions, virtual machines or containers executing on one or more physical processing nodes in one or more networks).

In some embodiments, some or all of the functions described herein may be implemented as virtual components executed by one or more virtual machines implemented in one or more virtual environments QQ300 hosted by one or more of hardware nodes QQ330. Further, in embodiments in which the virtual node is not a radio access node or does not require radio connectivity (e.g., a core network node), then the network node may be entirely virtualized.

The functions may be implemented by one or more applications QQ320 (which may alternatively be called software instances, virtual appliances, network functions, virtual nodes, virtual network functions, etc.) operative to implement some of the features, functions, and/or benefits of some of the embodiments disclosed herein. Applications QQ320 are run in virtualization environment QQ300 which provides hardware QQ330 comprising processing circuitry QQ360 and memory QQ390. Memory QQ390 contains instructions QQ395 executable by processing circuitry QQ360 whereby application QQ320 is operative to provide one or more of the features, benefits, and/or functions disclosed herein.

Virtualization environment QQ300, comprises general-purpose or special-purpose network hardware devices QQ330 comprising a set of one or more processors or processing circuitry QQ360, which may be commercial off-the-shelf (COTS) processors, dedicated Application Specific Integrated Circuits (ASICs), or any other type of processing circuitry including digital or analog hardware components or special purpose processors. Each hardware device may comprise memory QQ390-1 which may be non-persistent memory for temporarily storing instructions QQ395 or software executed by processing circuitry QQ360. Each hardware device may comprise one or more network interface controllers (NICs) QQ370, also known as network interface cards, which include physical network interface QQ380. Each hardware device may also include non-transitory, persistent, machine-readable storage media QQ390-2 having stored therein software QQ395 and/or instructions executable by processing circuitry QQ360. Software QQ395 may include any type of software including software for instantiating one or more virtualization layers QQ350 (also referred to as hypervisors), software to execute virtual machines QQ340 as well as software allowing it to execute functions, features and/or benefits described in relation with some embodiments described herein.

Virtual machines QQ340, comprise virtual processing, virtual memory, virtual networking or interface and virtual storage, and may be run by a corresponding virtualization layer QQ350 or hypervisor. Different embodiments of the instance of virtual appliance QQ320 may be implemented on one or more of virtual machines QQ340, and the implementations may be made in different ways.

During operation, processing circuitry QQ360 executes software QQ395 to instantiate the hypervisor or virtualization layer QQ350, which may sometimes be referred to as a virtual machine monitor (VMM). Virtualization layer QQ350 may present a virtual operating platform that appears like networking hardware to virtual machine QQ340.

As shown in FIG. 16, hardware QQ330 may be a standalone network node with generic or specific components.

Hardware QQ330 may comprise antenna QQ3225 and may implement some functions via virtualization. Alternatively, hardware QQ330 may be part of a larger cluster of hardware (e.g. such as in a data center or customer premise equipment (CPE)) where many hardware nodes work together and are managed via management and orchestration (MANO) QQ3100, which, among others, oversees lifecycle management of applications QQ320.

Virtualization of the hardware is in some contexts referred to as network function virtualization (NFV). NFV may be used to consolidate many network equipment types onto industry standard high volume server hardware, physical switches, and physical storage, which can be located in data centers, and customer premise equipment.

In the context of NFV, virtual machine QQ340 may be a software implementation of a physical machine that runs programs as if they were executing on a physical, non-virtualized machine. Each of virtual machines QQ340, and that part of hardware QQ330 that executes that virtual machine, be it hardware dedicated to that virtual machine and/or hardware shared by that virtual machine with others of the virtual machines QQ340, forms a separate virtual network elements (VNE).

Still in the context of NFV, Virtual Network Function (VNF) is responsible for handling specific network functions that run in one or more virtual machines QQ340 on top of hardware networking infrastructure QQ330 and corresponds to application QQ320 in FIG. 16.

In some embodiments, one or more radio units QQ3200 that each include one or more transmitters QQ3220 and one or more receivers QQ3210 may be coupled to one or more antennas QQ3225. Radio units QQ3200 may communicate directly with hardware nodes QQ330 via one or more appropriate network interfaces and may be used in combination with the virtual components to provide a virtual node with radio capabilities, such as a radio access node or a base station.

In some embodiments, some signalling can be effected with the use of control system QQ3230 which may alternatively be used for communication between the hardware nodes QQ330 and radio units QQ3200.

Figure 17:
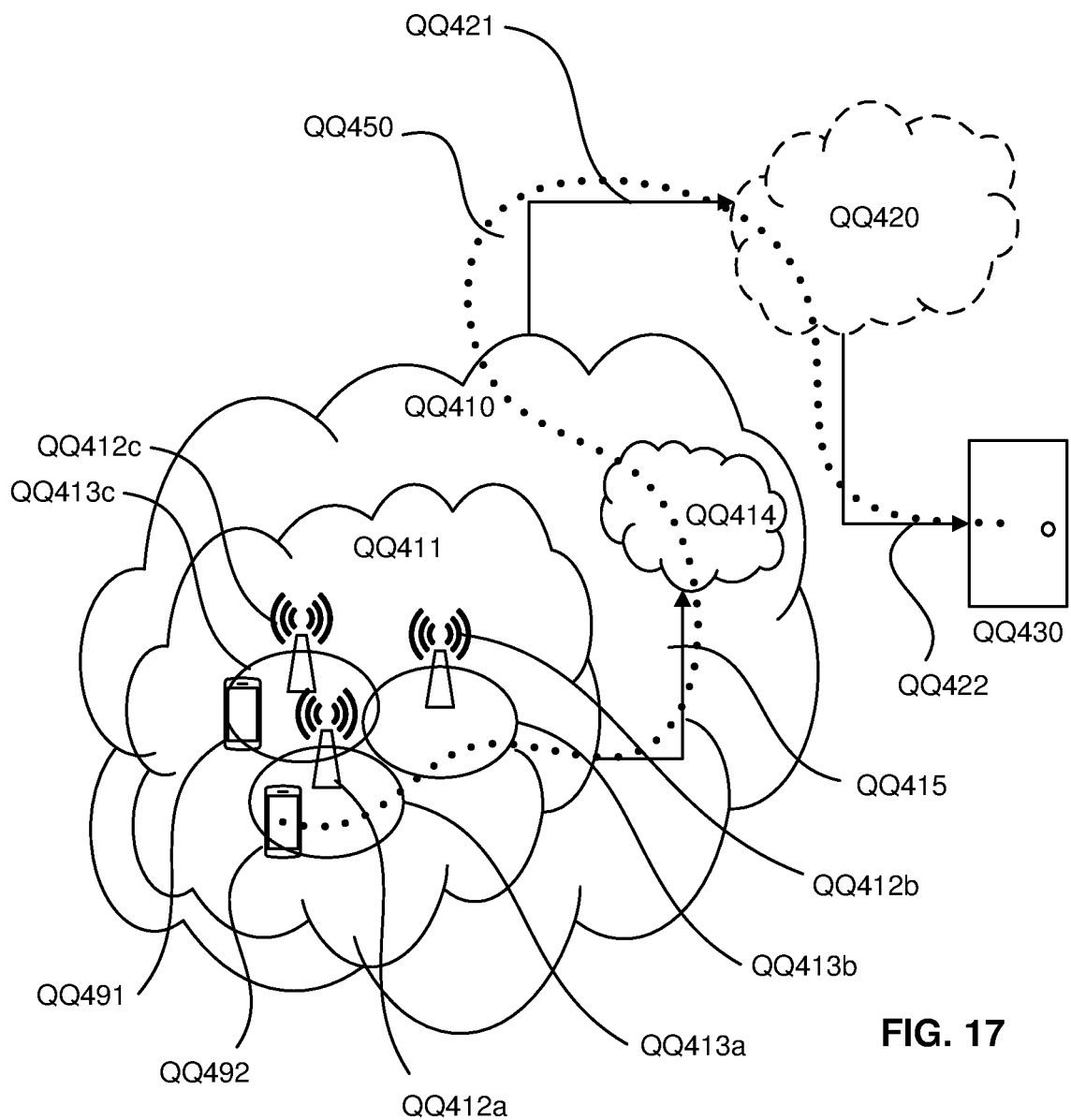
FIG. 17 is a block diagram of a telecommunication network connected via an intermediate network to a host computer in accordance with some embodiments.

FIG. 17: Telecommunication network connected via an intermediate network to a host computer in accordance with some embodiments.

With reference to FIG. 17, in accordance with an embodiment, a communication system includes telecommunication network QQ410, such as a 3GPP-type cellular network, which comprises access network QQ411, such as a radio access network, and core network QQ414. Access network QQ411 comprises a plurality of base stations QQ412a, QQ412b, QQ412c, such as NBs, eNBs, gNBs or other types of wireless access points, each defining a corresponding coverage area QQ413a, QQ413b, QQ413c. Each base station QQ412a, QQ412b, QQ412c is connectable to core network QQ414 over a wired or wireless connection QQ415. A first UE QQ491 located in coverage area QQ413c is configured to wirelessly connect to, or be paged by, the corresponding base station QQ412c. A second UE QQ492 in coverage area QQ413a is wirelessly connectable to the corresponding base station QQ412a. While a plurality of UEs QQ491, QQ492 are illustrated in this example, the disclosed embodiments are equally applicable to a situation where a sole UE is in the coverage area or where a sole UE is connecting to the corresponding base station QQ412.

Telecommunication network QQ410 is itself connected to host computer QQ430, which may be embodied in the hardware and/or software of a standalone server, a cloud-implemented server, a distributed server or as processing resources in a server farm. Host computer QQ430 may be under the ownership or control of a service provider, or may be operated by the service provider or on behalf of the service provider. Connections QQ421 and QQ422 between telecommunication network QQ410 and host computer QQ430 may extend directly from core network QQ414 to host computer QQ430 or may go via an optional intermediate network QQ420. Intermediate network QQ420 may be one of, or a combination of more than one of, a public, private or hosted network; intermediate network QQ420, if any, may be a backbone network or the Internet; in particular, intermediate network QQ420 may comprise two or more sub-networks (not shown).

The communication system of FIG. 17 as a whole enables connectivity between the connected UEs QQ491, QQ492 and host computer QQ430. The connectivity may be described as an over-the-top (OTT) connection QQ450. Host computer QQ430 and the connected UEs QQ491, QQ492 are configured to communicate data and/or signaling via OTT connection QQ450, using access network QQ411, core network QQ414, any intermediate network QQ420 and possible further infrastructure (not shown) as intermediaries. OTT connection QQ450 may be transparent in the sense that the participating communication devices through which OTT connection QQ450 passes are unaware of routing of uplink and downlink communications. For example, base station QQ412 may not or need not be informed about the past routing of an incoming downlink communication with data originating from host computer QQ430 to be forwarded (e.g., handed over) to a connected UE QQ491. Similarly, base station QQ412 need not be aware of the future routing of an outgoing uplink communication originating from the UE QQ491 towards the host computer QQ430.

Figure 18:
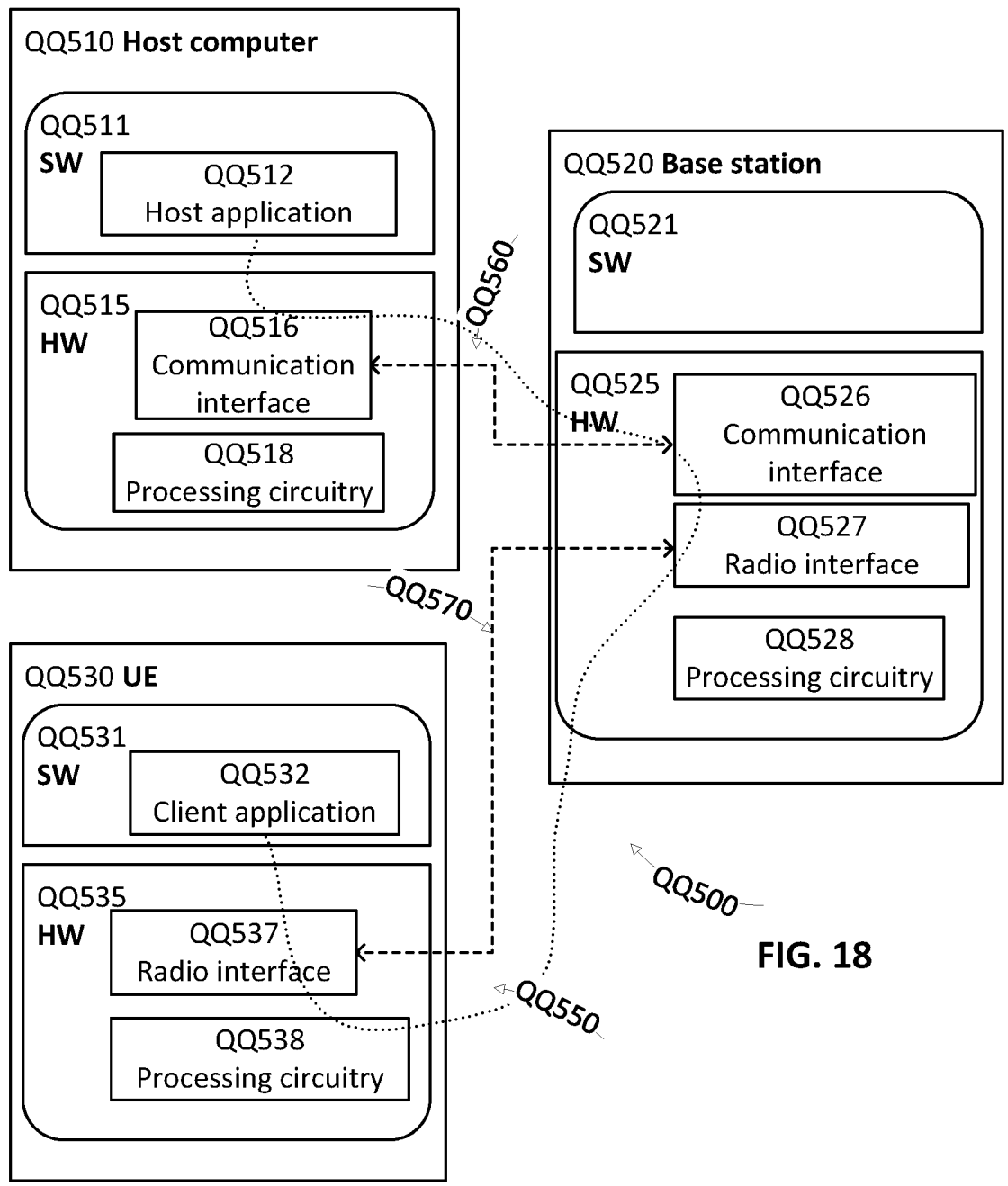
FIG. 18 is a block diagram of a host computer communicating via a base station with a user equipment over a partially wireless connection in accordance with some embodiments.

FIG. 18: Host computer communicating via a base station with a user equipment over a partially wireless connection in accordance with some embodiments.

Example implementations, in accordance with an embodiment, of the UE, base station and host computer discussed in the preceding paragraphs will now be described with reference to FIG. 18. In communication system QQ500, host computer QQ510 comprises hardware QQ515 including communication interface QQ516 configured to set up and maintain a wired or wireless connection with an interface of a different communication device of communication system QQ500. Host computer QQ510 further comprises processing circuitry QQ518, which may have storage and/or processing capabilities. In particular, processing circuitry QQ518 may comprise one or more programmable processors, application-specific integrated circuits, field programmable gate arrays or combinations of these (not shown) adapted to execute instructions. Host computer QQ510 further comprises software QQ511, which is stored in or accessible by host computer QQ510 and executable by processing circuitry QQ518. Software QQ511 includes host application QQ512. Host application QQ512 may be operable to provide a service to a remote user, such as UE QQ530 connecting via OTT connection QQ550 terminating at UE QQ530 and host computer QQ510. In providing the service to the remote user, host application QQ512 may provide user data which is transmitted using OTT connection QQ550.

Communication system QQ500 further includes base station QQ520 provided in a telecommunication system and comprising hardware QQ525 enabling it to communicate with host computer QQ510 and with UE QQ530. Hardware QQ525 may include communication interface QQ526 for setting up and maintaining a wired or wireless connection with an interface of a different communication device of communication system QQ500, as well as radio interface QQ527 for setting up and maintaining at least wireless connection QQ570 with UE QQ530 located in a coverage area (not shown in FIG. 18) served by base station QQ520. Communication interface QQ526 may be configured to facilitate connection QQ560 to host computer QQ510. Connection QQ560 may be direct or it may pass through a core network (not shown in FIG. 18) of the telecommunication system and/or through one or more intermediate networks outside the telecommunication system. In the embodiment shown, hardware QQ525 of base station QQ520 further includes processing circuitry QQ528, which may comprise one or more programmable processors, application-specific integrated circuits, field programmable gate arrays or combinations of these (not shown) adapted to execute instructions. Base station QQ520 further has software QQ521 stored internally or accessible via an external connection.

Communication system QQ500 further includes UE QQ530 already referred to. Its hardware QQ535 may include radio interface QQ537 configured to set up and maintain wireless connection QQ570 with a base station serving a coverage area in which UE QQ530 is currently located. Hardware QQ535 of UE QQ530 further includes processing circuitry QQ538, which may comprise one or more programmable processors, application-specific integrated circuits, field programmable gate arrays or combinations of these (not shown) adapted to execute instructions. UE QQ530 further comprises software QQ531, which is stored in or accessible by UE QQ530 and executable by processing circuitry QQ538. Software QQ531 includes client application QQ532. Client application QQ532 may be operable to provide a service to a human or non-human user via UE QQ530, with the support of host computer QQ510. In host computer QQ510, an executing host application QQ512 may communicate with the executing client application QQ532 via OTT connection QQ550 terminating at UE QQ530 and host computer QQ510. In providing the service to the user, client application QQ532 may receive request data from host application QQ512 and provide user data in response to the request data. OTT connection QQ550 may transfer both the request data and the user data. Client application QQ532 may interact with the user to generate the user data that it provides.

It is noted that host computer QQ510, base station QQ520 and UE QQ530 illustrated in FIG. 18 may be similar or identical to host computer QQ430, one of base stations QQ412a, QQ412b, QQ412c and one of UEs QQ491, QQ492 of FIG. 17, respectively. This is to say, the inner workings of these entities may be as shown in FIG. 18 and independently, the surrounding network topology may be that of FIG. 17.

In FIG. 18, OTT connection QQ550 has been drawn abstractly to illustrate the communication between host computer QQ510 and UE QQ530 via base station QQ520, without explicit reference to any intermediary devices and the precise routing of messages via these devices. Network infrastructure may determine the routing, which it may be configured to hide from UE QQ530 or from the service provider operating host computer QQ510, or both. While OTT connection QQ550 is active, the network infrastructure may further take decisions by which it dynamically changes the routing (e.g., on the basis of load balancing consideration or reconfiguration of the network).

Wireless connection QQ570 between UE QQ530 and base station QQ520 is in accordance with the teachings of the embodiments described throughout this disclosure. One or more of the various embodiments may improve the performance of OTT services provided to UE QQ530 using OTT connection QQ550, in which wireless connection QQ570 forms the last segment. More precisely, the teachings of these embodiments may improve the deblock filtering for video processing and thereby provide benefits such as improved video encoding and/or decoding.

A measurement procedure may be provided for the purpose of monitoring data rate, latency and other factors on which the one or more embodiments improve. There may further be an optional network functionality for reconfiguring OTT connection QQ550 between host computer QQ510 and UE QQ530, in response to variations in the measurement results. The measurement procedure and/or the network functionality for reconfiguring OTT connection QQ550 may be implemented in software QQ511 and hardware QQ515 of host computer QQ510 or in software QQ531 and hardware QQ535 of UE QQ530, or both. In embodiments, sensors (not shown) may be deployed in or in association with communication devices through which OTT connection QQ550 passes; the sensors may participate in the measurement procedure by supplying values of the monitored quantities exemplified above, or supplying values of other physical quantities from which software QQ511, QQ531 may compute or estimate the monitored quantities. The reconfiguring of OTT connection QQ550 may include message format, retransmission settings, preferred routing etc.; the reconfiguring need not affect base station QQ520, and it may be unknown or imperceptible to base station QQ520. Such procedures and functionalities may be known and practiced in the art. In certain embodiments, measurements may involve proprietary UE signaling facilitating host computer QQ510's measurements of throughput, propagation times, latency and the like. The measurements may be implemented in that software QQ511 and QQ531 causes messages to be transmitted, in particular empty or 'dummy' messages, using OTT connection QQ550 while it monitors propagation times, errors etc.

Figure 19:
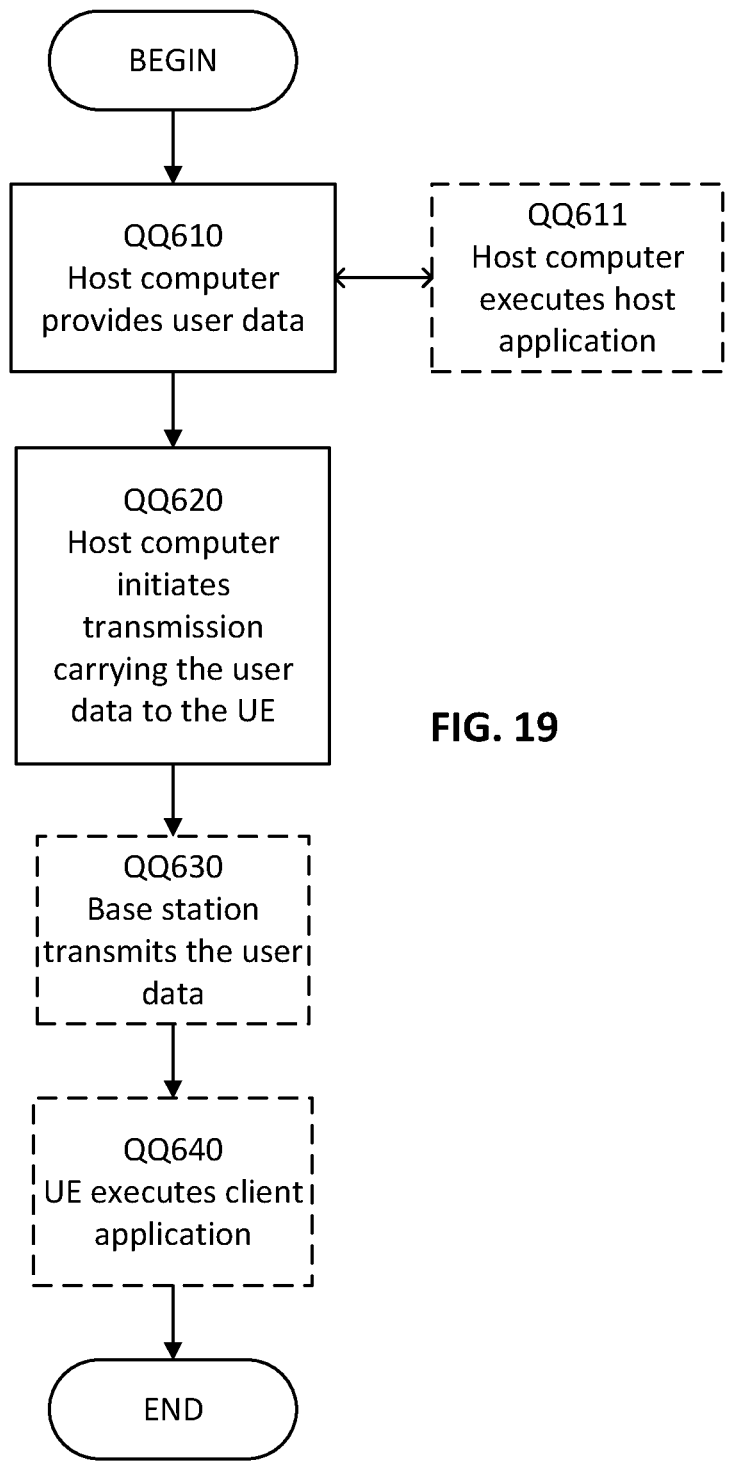
FIG. 19 is a block diagram of methods implemented in a communication system including a host computer, a base station, and a user equipment in accordance with some embodiments.

FIG. 19: Methods implemented in a communication system including a host computer, a base station and a user equipment in accordance with some embodiments.

FIG. 19 is a flowchart illustrating a method implemented in a communication system, in accordance with one embodiment. The communication system includes a host computer, a base station and a UE which may be those described with reference to Figures QQ4 and QQ5. For simplicity of the present disclosure, only drawing references to FIG. 19 will be included in this section. In step QQ610, the host computer provides user data. In substep QQ611 (which may be optional) of step QQ610, the host computer provides the user data by executing a host application. In step QQ620, the host computer initiates a transmission carrying the user data to the UE. In step QQ630 (which may be optional), the base station transmits to the UE the user data which was carried in the transmission that the host computer initiated, in accordance with the teachings of the embodiments described throughout this disclosure. In step QQ640 (which may also be optional), the UE executes a client application associated with the host application executed by the host computer.

Figure 20:
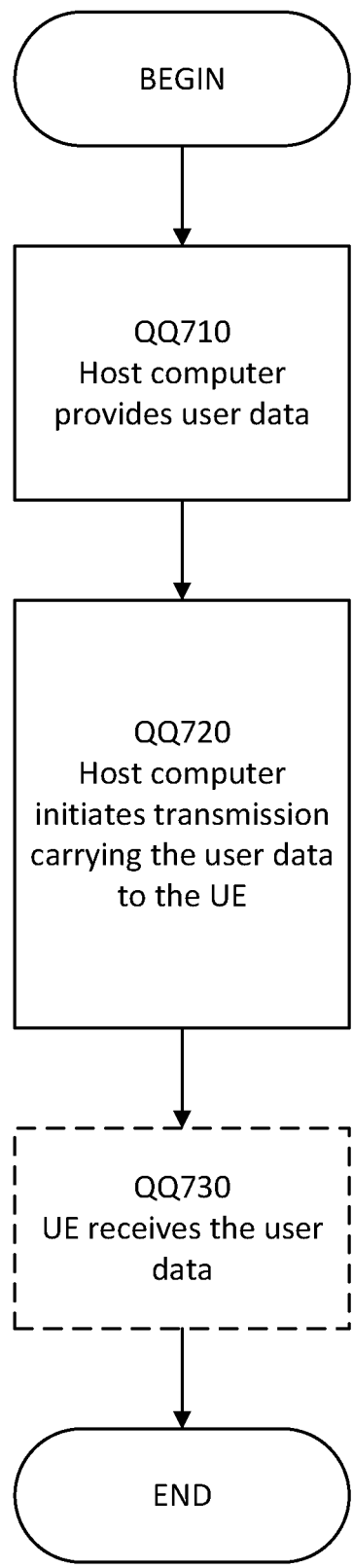
FIG. 20 is a block diagram of methods implemented in a communication system including a host computer, a base station, and a user equipment in accordance with some embodiments.

FIG. 20: Methods implemented in a communication system including a host computer, a base station and a user equipment in accordance with some embodiments.

FIG. 20 is a flowchart illustrating a method implemented in a communication system, in accordance with one embodiment. The communication system includes a host computer, a base station and a UE which may be those described with reference to Figures QQ4 and QQ5. For simplicity of the present disclosure, only drawing references to FIG. 20 will be included in this section. In step QQ710 of the method, the host computer provides user data. In an optional substep (not shown) the host computer provides the user data by executing a host application. In step QQ720, the host computer initiates a transmission carrying the user data to the UE. The transmission may pass via the base station, in accordance with the teachings of the embodiments described throughout this disclosure. In step QQ730 (which may be optional), the UE receives the user data carried in the transmission.

Figure 21:
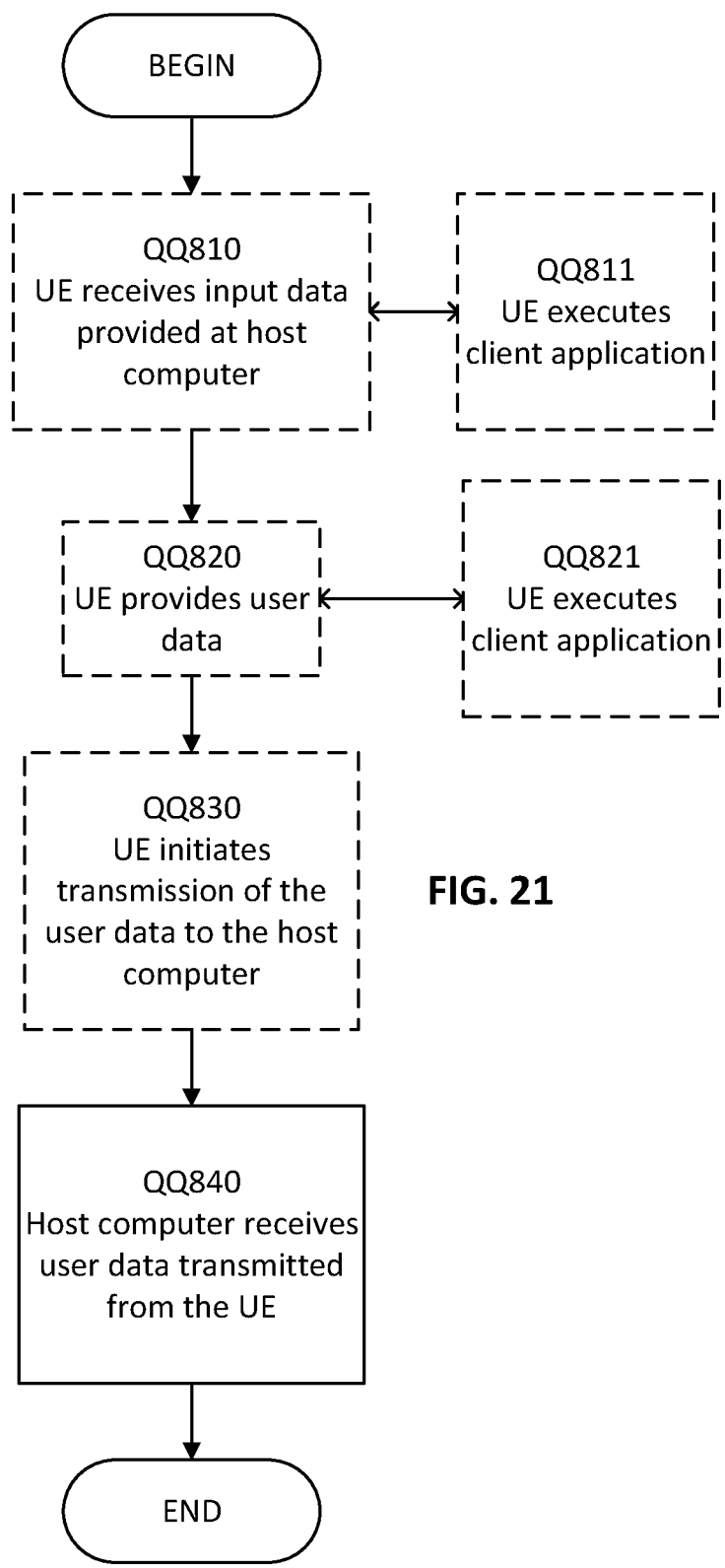
FIG. 21 is a block diagram of methods implemented in a communication system including a host computer, a base station, and a user equipment in accordance with some embodiments.

FIG. 21: Methods implemented in a communication system including a host computer, a base station and a user equipment in accordance with some embodiments.

FIG. 21 is a flowchart illustrating a method implemented in a communication system, in accordance with one embodiment. The communication system includes a host computer, a base station and a UE which may be those described with reference to Figures QQ4 and QQ5. For simplicity of the present disclosure, only drawing references to FIG. 21 will be included in this section. In step QQ810 (which may be optional), the UE receives input data provided by the host computer. Additionally or alternatively, in step QQ820, the UE provides user data. In substep QQ821 (which may be optional) of step QQ820, the UE provides the user data by executing a client application. In substep QQ811 (which may be optional) of step QQ810, the UE executes a client application which provides the user data in reaction to the received input data provided by the host computer. In providing the user data, the executed client application may further consider user input received from the user. Regardless of the specific manner in which the user data was provided, the UE initiates, in substep QQ830 (which may be optional), transmission of the user data to the host computer. In step QQ840 of the method, the host computer receives the user data transmitted from the UE, in accordance with the teachings of the embodiments described throughout this disclosure.

Figure 22:
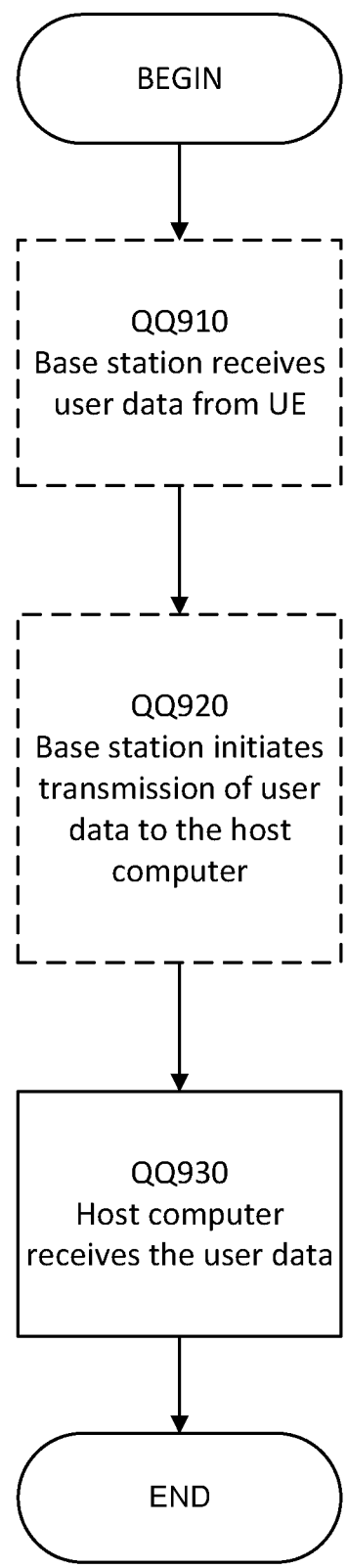
FIG. 22 is a block diagram of methods implemented in a communication system including a host computer, a base station, and a user equipment in accordance with some embodiments.

FIG. 22: Methods implemented in a communication system including a host computer, a base station and a user equipment in accordance with some embodiments.

FIG. 22 is a flowchart illustrating a method implemented in a communication system, in accordance with one embodiment. The communication system includes a host computer, a base station and a UE which may be those described with reference to Figures QQ4 and QQ5. For simplicity of the present disclosure, only drawing references to FIG. 22 will be included in this section. In step QQ910 (which may be optional), in accordance with the teachings of the embodiments described throughout this disclosure, the base station receives user data from the UE. In step QQ920 (which may be optional), the base station initiates transmission of the received user data to the host computer. In step QQ930 (which may be optional), the host computer receives the user data carried in the transmission initiated by the base station.

Any appropriate steps, methods, features, functions, or benefits disclosed herein may be performed through one or more functional units or modules of one or more virtual apparatuses. Each virtual apparatus may comprise a number of these functional units. These functional units may be implemented via processing circuitry, which may include one or more microprocessor or microcontrollers, as well as other digital hardware, which may include digital signal processors (DSPs), special-purpose digital logic, and the like. The processing circuitry may be configured to execute program code stored in memory, which may include one or several types of memory such as read-only memory (ROM), random-access memory (RAM), cache memory, flash memory devices, optical storage devices, etc. Program code stored in memory includes program instructions for executing one or more telecommunications and/or data communications protocols as well as instructions for carrying out one or more of the techniques described herein. In some implementations, the processing circuitry may be used to cause the respective functional unit to perform corresponding functions according one or more embodiments.

The term unit may have conventional meaning in the field of electronics, electrical devices and/or electronic devices and may include, for example, electrical and/or electronic circuitry, devices, modules, processors, memories, logic solid state and/or discrete devices, computer programs or instructions for carrying out respective tasks, procedures, computations, outputs, and/or displaying functions, and so on, as such as those that are described herein.

The invention claimed is:

1. A method performed by a decoder, the method comprising:
   obtaining a current inter block and a plurality of previously decoded inter blocks, each inter block of the plurality of inter blocks including a motion vector having a resolution; and
   generating a list of motion vector predictor candidates that is used to predict the motion vector that is associated with the current inter block, wherein generating the list of motion vector predictor candidates comprises:
   defining a set of inter blocks that includes a number of previously decoded inter blocks;
   scanning the inter blocks in the set of inter blocks in a scanning order; and
   for each of the inter blocks in the set of inter blocks:
   deriving a motion vector prediction candidate using the motion vector of the inter block;
   determining whether a criterion relating to one or both of the inter block and the current inter block is satisfied, wherein the criterion is satisfied responsive to the inter block being from a different picture than a picture that includes the current inter block and a resolution of the motion vector prediction candidate exceeding a resolution threshold; and
   either:
   responsive to determining that the criterion is satisfied, adding the motion vector prediction candidate to the list of motion vector prediction candidates without performing a motion vector comparison operation with existing motion vector prediction candidates that are in the list of motion vector prediction candidates corresponding to the current inter block; or
   responsive to determining that the criterion is not satisfied, performing the motion vector comparison operation to compare the motion vector prediction candidate with the existing motion vector prediction candidates that are in the list of motion vector prediction candidates corresponding to the current inter block.

2. The method of claim 1, further comprising:
   responsive to performing the motion vector comparison operation, determining that the motion vector prediction candidate does not match any of the existing motion vector prediction candidates that are in the list of motion vector prediction candidates; and
   responsive to determining that the motion vector prediction candidate does not match any of the existing motion vector prediction candidates that are in the list of motion vector prediction candidates, adding the motion vector prediction candidate to the list of motion vector prediction candidates.

3. The method of claim 1, further comprising:
responsive to performing the motion vector comparison operation, determining that the motion vector prediction candidate matches one of the existing motion vector prediction candidates that are in the list of motion vector prediction candidates; and
responsive to determining that the motion vector prediction candidate matches one of the existing motion vector prediction candidates that are in the list of motion vector prediction candidates, not adding the motion vector prediction candidate to the list of motion vector prediction candidates.

4. The method of claim 1, wherein the set of inter blocks that includes the number of previously decoded inter blocks comprises inter blocks that are in a current picture.

5. The method of claim 1, wherein the set of inter blocks that includes the number of previously decoded inter blocks comprises inter blocks that are in a previously decoded picture.

6. The method of claim 1, further comprising:
determining a resolution of the current inter block; and
responsive to the resolution of the current inter block being different from a resolution of the motion vector prediction candidate, performing a conversion of the motion vector prediction candidate to match the resolution of the current inter block.

7. The method of claim 1, further comprising:
responsive to generating the list of motion vector predictor candidates, decoding video data that includes a video sequence of a plurality of pictures based on generating the list of motion vector predictor candidates that is used to predict the motion vector that is associated with the current inter block.

8. The method of claim 1, wherein the criterion is satisfied responsive to the inter block being spatially non-adjacent the current inter block,
the method further comprising:
responsive to determining that the criterion is satisfied based on the inter block being non-adjacent the current inter block, adding the motion vector prediction candidate to the list of motion vector prediction candidates without performing a comparison with existing motion vector prediction candidates that are in the list of motion vector prediction candidates.

9. The method of claim 1, wherein the criterion is satisfied responsive to the inter block having a spatial distance from the current inter block that exceeds a spatial distance threshold,
the method further comprising:
responsive to determining that the criterion is satisfied based on the spatial distance between the inter block and the current inter block exceeding a spatial distance threshold, adding the motion vector prediction candidate to the list of motion vector prediction candidates without performing a comparison with existing motion vector prediction candidates that are in the list of motion vector prediction candidates.

10. The method of claim 1, wherein the criterion is satisfied responsive to any of the components of the motion vector prediction of the current block exceeding a motion vector prediction component threshold.

11. The method of claim 1, wherein the criterion is satisfied responsive to a number of occurrences of a motion vector prediction candidate comparison exceeding a threshold value, the threshold value being less than a size of the list of motion vector prediction candidates.

12. The method of claim 1, wherein the criterion is at least related to a spatial relationship between the current inter block and the one or both of the inter block.

13. The method of claim 1, wherein the scanning order is a decoding order.

14. A decoder apparatus, comprising:
a processor; and
memory coupled with the processor, wherein the memory comprises instructions that when executed by the processor cause the decoder apparatus to perform operations, the operations comprising:
obtaining a current inter block and a plurality of previously decoded inter blocks, each inter block of the plurality of inter blocks including a motion vector having a resolution; and
generating a list of motion vector predictor candidates that is used to predict the motion vector that is associated with the current inter block, wherein generating the list of motion vector predictor candidates comprises:
defining a set of inter blocks that includes a number of previously decoded inter blocks;
scanning the inter blocks in the set of inter blocks in a scanning order; and
for each of the inter blocks in the set of inter blocks:
deriving a motion vector prediction candidate using the motion vector of the inter block;
determining whether a criterion relating to one or both of the inter block and the current inter block is satisfied, wherein the criterion is satisfied responsive to the inter block being from a different picture than a picture that includes the current inter block and a resolution of the motion vector prediction candidate exceeding a resolution threshold; and
either:
responsive to determining that the criterion is satisfied, adding the motion vector prediction candidate to the list of motion vector prediction candidates without performing a motion vector comparison operation with existing motion vector prediction candidates that are in the list of motion vector prediction candidates corresponding to the current inter block; or
responsive to determining that the criterion is not satisfied, performing the motion vector comparison operation to compare the motion vector prediction candidate with the existing motion vector prediction candidates that are in the list of motion vector prediction candidates corresponding to the current inter block.

15. The decoder apparatus of claim 14, the operations further comprising:
responsive to performing the motion vector comparison operation, determining that the motion vector prediction candidate does not match any of the existing motion vector prediction candidates that are in the list of motion vector prediction candidates; and
responsive to determining that the motion vector prediction candidate does not match any of the existing motion vector prediction candidates that are in the list of motion vector prediction candidates, adding the motion vector prediction candidate to the list of motion vector prediction candidates.

16. The decoder apparatus of claim 14, the operations further comprising:
  responsive to performing the motion vector comparison operation, determining that the motion vector prediction candidate matches one of the existing motion vector prediction candidates that are in the list of motion vector prediction candidates; and
  responsive to determining that the motion vector prediction candidate matches one of the existing motion vector prediction candidates that are in the list of motion vector prediction candidates, not adding the motion vector prediction candidate to the list of motion vector prediction candidates.

17. The decoder apparatus of claim 14, wherein the set of inter blocks that includes the number of previously decoded inter blocks comprises at least one of:
  inter blocks that are in a current picture; and
  inter blocks that are in a previously decoded picture.

18. The decoder apparatus of claim 14, the operations further comprising:
  determining a resolution of the current inter block; and
  responsive to the resolution of the current inter block being different from a resolution of the motion vector prediction candidate, performing a conversion of the motion vector prediction candidate to match the resolution of the current inter block.

19. A non-transitory computer-readable medium having instructions stored therein that are executable to perform operations comprising:
  obtaining a current inter block and a plurality of previously decoded inter blocks, each inter block of the plurality of inter blocks including a motion vector having a resolution; and
  generating a list of motion vector predictor candidates that is used to predict the motion vector that is associated with the current inter block, wherein generating the list of motion vector predictor candidates comprises:
  defining a set of inter blocks that includes a number of previously decoded inter blocks;
  scanning the inter blocks in the set of inter blocks in a scanning order; and
  for each of the inter blocks in the set of inter blocks:
    deriving a motion vector prediction candidate using the motion vector of the inter block;
    determining whether a criterion relating to one or both of the inter block and the current inter block is satisfied, wherein the criterion is satisfied responsive to the motion vector prediction candidate of the inter block being included in a history based motion vector prediction ("HMVP") table and a resolution of the motion vector prediction candidate exceeding a resolution threshold; and
    either:
      responsive to determining that the criterion is satisfied, adding the motion vector prediction candidate to the list of motion vector prediction candidates without performing a motion vector comparison operation with existing motion vector prediction candidates that are in the list of motion vector prediction candidates corresponding to the current inter block; or
      responsive to determining that the criterion is not satisfied, performing the motion vector comparison operation to compare the motion vector prediction candidate with the existing motion vector prediction candidates that are in the list of motion vector prediction candidates corresponding to the current inter block.

* * * * *